(12) United States Patent
Mimura et al.

(10) Patent No.: US 7,162,058 B2
(45) Date of Patent: Jan. 9, 2007

(54) AUTHENTICATION SYSTEM BY FINGERPRINT

(75) Inventors: Masahiro Mimura, Kawasaki (JP); Yoichi Seto, Kawasaki (JP); Takuo Ishizuka, Hadano (JP)

(73) Assignee: Hitachi, Ltd., Tokyo (JP)

( * ) Notice: Subject to any disclaimer, the term of this patent is extended or adjusted under 35 U.S.C. 154(b) by 448 days.

(21) Appl. No.: 09/937,004

(22) PCT Filed: May 25, 2001

(86) PCT No.: PCT/JP01/04405

§ 371 (c)(1),
(2), (4) Date: May 22, 2002

(87) PCT Pub. No.: WO01/93053

PCT Pub. Date: Dec. 6, 2001

(65) Prior Publication Data

US 2002/0150283 A1    Oct. 17, 2002

(30) Foreign Application Priority Data

May 31, 2000    (JP)    ............................ 2000-162517

(51) Int. Cl.
*G06K 9/00* (2006.01)
(52) U.S. Cl. ...................................... 382/124; 382/116
(58) Field of Classification Search ........ 382/115–127, 382/124; 380/383–384; 340/5.52–5.53, 340/5.81–5.84; 396/15; 902/3; 283/68–69
See application file for complete search history.

(56) References Cited

U.S. PATENT DOCUMENTS 5,040,224 A * 8/1991 Hara ........................... 382/124
5,067,162 A * 11/1991 Driscoll et al. ............. 382/126
5,140,642 A * 8/1992 Hsu et al. .................... 382/124
5,915,035 A * 6/1999 Hsiao et al. ................. 382/125
5,920,641 A * 7/1999 Ueberreiter et al. ........ 382/125
5,974,163 A * 10/1999 Kamei ......................... 382/125
6,002,784 A * 12/1999 Sato ............................ 382/124
6,134,340 A * 10/2000 Hsu et al. .................... 382/124
6,181,807 B1 * 1/2001 Setlak et al. ................. 382/124
6,241,288 B1 * 6/2001 Bergenek et al. ............. 283/67
6,681,034 B1 * 1/2004 Russo ......................... 382/125
6,719,200 B1 * 4/2004 Wiebe ......................... 235/382

(Continued)

FOREIGN PATENT DOCUMENTS

DE    19811332    9/1999

(Continued)

OTHER PUBLICATIONS

L. Hong, "Automatic Personal Identification Using Fingerprints", Ph.D. Thesis, Michigan State University, pp. 147-166, Jun. 1998.*

(Continued)

*Primary Examiner*—Bhavesh M. Mehta
*Assistant Examiner*—Wes Tucker
(74) *Attorney, Agent, or Firm*—Mattingly, Stanger, Malur & Brundidge, P.C.

(57) ABSTRACT

A fingerprint identification system comprising: an IC card having a tamper-resistance; and a reader/writer having a tamper-resistance for reading/writing information from/into the IC card. In the reader/writer, a fingerprint image, as read by a fingerprint input unit, is preprocessed in a preprocessing unit, and extracted intermediate information is transmitted to the IC card. This IC card compares the intermediate information with the fingerprint information, and makes authentication information usable for an electronic authentication upon matching. By this electronic authentication with applications, the fingerprint identification system, which has a high level of safety and can reduce the cost is provided.

21 Claims, 26 Drawing Sheets

U.S. PATENT DOCUMENTS 6,798,334 B1 * 9/2004 Meister et al. ............. 340/5.52
2004/0052405 A1 * 3/2004 Walfridsson ................ 382/115

FOREIGN PATENT DOCUMENTS

| EP | 0918300 A2 | | 5/1999 |
|----|------------|---|--------|
| JP | 3-202973 A | | 9/1991 |
| JP | 06301768 | | 10/1994 |
| JP | 06301768 A | * | 10/1994 |
| JP | 9198501 | | 7/1997 |
| JP | 10124668 | | 5/1998 |
| JP | 10149446 | | 6/1998 |
| JP | 11143833 | | 5/1999 |
| JP | 11143833 A | * | 5/1999 |
| WO | 0106445 A1 | | 1/2001 |
| WO | 0111577 A1 | | 2/2001 |
| WO | 0184494 A1 | | 11/2001 |

OTHER PUBLICATIONS

A.M. Bazen and S.H. Gerez, "Extraction of Singular Points from Directional Fields of Fingerprints", Mobile Communications in Perspective, Annual CTIT Workshop, Feb. 2001.*

Seto et al., "Development of Personal Authentication Techniques Using Fingerprint Matching Embedded in Smartcard", The 2000 Symposium on Cryptography and Information Security, Okinawa, Japan, Jan. 26-28, 2000. (W/English Translation).

* cited by examiner

FIG.3

| ITEMS | | CONTENTS |
|---|---|---|
| NUMBER OF CHIPS | | 30 |
| X-COORDINATE OF CORE | | 50 |
| Y-COORDINATE OF CORE | | 55 |
| 1ST CHIP | X-COORDINATE | 12 |
| | Y-COORDINATE | 16 |
| | CHIP IMAGE | BINARY DATA |
| 2ND CHIP IMAGE | X-COORDINATE | 30 |
| | Y-COORDINATE | 35 |
| | CHIP IMAGE | BINARY DATA |
| . | . | . |
| . | . | . |
| 30-TH CHIP IMAGE | X-COORDINATE | 100 |
| | Y-COORDINATE | 90 |
| | CHIP IMAGE | BINARY DATA |

FIG.10

| CANDIDATE POINT INDEX (j) | COORDINATES | | CURVATURE |
|---|---|---|---|
| | X-COORDINATE | Y-COORDINATE | |
| 1 | 25 | 25 | — |
| 2 | 30 | 32 | -1.0 |
| 3 | 42 | 45 | -0.8 |
| 4 | 50 | 50 | -0.3 |
| 5 | 60 | 45 | -0.9 |
| 6 | 70 | 40 | -0.9 |
| 7 | 80 | 30 | — |

FIG.11

| INDEX (i) OF RETRIEVAL NUMBER | COORDINATES OF POINTS HAVING MAXIMUM CURVATURES | | MAXIMUM CURVATURES |
|---|---|---|---|
| | X-COORDINATE | Y-COORDINATE | |
| 1 | 50 | 50 | -0.3 |
| 2 | 48 | 54 | -0.3 |
| 3 | 45 | 48 | -0.3 |
| 4 | 53 | 49 | -0.2 |
| 5 | 40 | 40 | -0.3 |
| 6 | 30 | 30 | -0.3 |
| 7 | 48 | 54 | -0.2 |
| 8 | 45 | 48 | -0.3 |
| 9 | 53 | 49 | -0.3 |
| 10 | 52 | 48 | -0.8 |

FIG.15

| CLA | INS | P | Lc | DATA FIELD | |
|---|---|---|---|---|---|
| CLASS CODE | COMMAND ID | PARAMETER OF COORDINATES | DATA LENGTH OF COORDINATES | X-COORDINATE | Y-COORDINATE |

| SW1 | SW 2 |
|---|---|
| STATUS | QUALIFIER |

| CLA | INS | P | Le |
|---|---|---|---|
| CLASS CODE | COMMAND ID | PARAMETER OF COORDINATES | DATA LENGTH OF COORDINATES |

1530

| DATA FIELD | | SW1 | SW 2 |
|---|---|---|---|
| X-COORDINATE | Y-COORDINATE | STATUS | QUALIFIER |

| CLA | INS | P | Lc | DATA FIELD |
|---|---|---|---|---|
| CLASS CODE | COMMAND ID | PARAMETER | DATA LENGTH | PARTIAL IMAGE |

| SW1 | SW 2 |
|---|---|
| STATUS | QUALIFIER |

| INDEX | MISMATCHED BIT NUMBER |
|---|---|
| 0 | 0 |
| 1 | 1 |
| 2 | 1 |
| 3 | 2 |
| 4 | 1 |
| 5 | 2 |
| . | . |
| . | . |
| . | . |
| . | . |
| . | . |
| 253 | 7 |
| 254 | 7 |
| 255 | 8 |

AUTHENTICATION SYSTEM BY FINGERPRINT

This application is a 371 of PCT/JP01/04405 May 25, 2001.

BACKGROUND TECHNIQUE

The present invention relates to a biological information identification technique used for controlling entrance into and exit from important facilities and for controlling access to an information system. More particularly, the present invention relates to a fingerprint identification technique.

In the prior art, there is known an access control technique that permits only a specific user registered in advance to go into and out of the facilities, or to utilize an information system by employing biological information such as a fingerprint. This access control technique is exemplified, as follows:

(1) Client Authentication System: As disclosed in Japanese Patent Application Laid Open No. 09-198501 (as will be called the "Document 1"), an unauthorized entrance into an administered region is prevented by comparing the biological information of a user registered in advance in a door control device with biological information inputted at the time of in-going and out-going.

(2) Server Authentication Type Fingerprint Identification system: As disclosed in Japanese Patent Application Laid Open No, 10-124668 (as will be called the "Document 2"), the unauthorized access to a computer system is prevented by allowing a server to have a user biological information file so that the user biological information inputted by a client is checked by the server.

(3) Mobile Fingerprint Identification System: As disclosed in Japanese Patent Application Laid Open No. 10-149446 (as will be called the "Document 3"), the unauthorized access to the computer system is prevented by recording user biological information in a mobile recording device such as an IC card so that the biological information of the user newly inputted is checked by the client.

According to the method described in Document 1, in the case where a door control device is implemented as a device without tamper-resistance, a problem may arise that the fingerprint information and the identification result of the user can be counterfeited, tampered or pirated, allowing an unauthorized user to impersonate a correct user (i.e., the impersonation).

According to the method described in Document 2, the server centrally controls the biological information that is intrinsic to the user for the fingerprint identifications.

Thus, the fingerprint information and the identification result are made difficult to counterfeit, tamper and pirate, unlike the method described in Document 1. However, there arise other problems, i.e., the user may be considerably reluctant to be centrally controlled with personal information such as a fingerprint, a large volume of biological information may be stolen all at once, and that cost for managing the files to record the biological information may be increased due to a large number of users control.

According to the method described in Document 3, the biological information is recorded in the mobile storage device such as the IC card having a tamper-resistance. Therefore, this method can solve the problems of user reluctance, stealing a large volume of biological information and high cost for managing the biological information, raised in the method described in Document 2. Since the fingerprint input device and the CFU packaged in the IC card perform inputting and identifying the fingerprint, the fingerprint information and the comparing result can be prevented from being counterfeited, tampered and pirated unlike the method described in Document 1, thereby providing a high level of safety, However, functions for inputting the biological information and for identifying the biological information have to be packaged in the IC card, thereby to raising a problem that the cost for the system is increased.

DISCLOSURE OF THE INVENTION

The present invention provides a fingerprint identification system having a high level of safety and a capability of reducing the cost.

A biometric authentication system of the present invention comprises a mobile storage device with a computing function having a tamper-resistance; and a reader/writer having a tamper-resistance for reading/writing information from/into the mobile storage device.

Moreover, the reader/writer includes a biological information input device for inputting biological information. The reader/writer preprocesses the biological information inputted by the biological information input device, and thus processed intermediate information is transmitted to the mobile storage device.

The mobile storage device includes; a template of biological information; and a secret key to be used for electronic authentication. The mobile storage device compares the intermediate information the template. When the information matches the template, the secret key is made available.

Where the biological information is fingerprint information, the reader/writer may transmit sequentially, to the, mobile storage device, the fingerprint image information necessary for the fingerprint identification, and the mobile storage device may process sequentially the transmitted fingerprint image information so that the fingerprint identification is performed.

Furthermore, information for correcting the positional displacement between a registered fingerprint recorded in the template and an input fingerprint that is newly inputted may be calculated by using a core position of the fingerprint, and a small image in the vicinity of a featuring point of the registered fingerprint is retrieved by matching it in the vicinity of the coordinates on which the positional displacement on the image of the input fingerprint is corrected, so that the identity of the fingerprint image to the template may be decided according to the number of matched small images. When the core position of the fingerprint is to be calculated, a normal vector of a ridge is retrieved and the position where the normal vector largely changes may be determined as the core of the fingerprint.

Moreover, information for correcting the positional displacement between a registered fingerprint recorded in the template and an input fingerprint that is newly inputted maybe calculated by forming images having specific luminance distributions in the peripheries of the individual featuring points for the inputted fingerprint and the registered fingerprint, and by correlating the images mutually.

BRIEF DESCRIPTION OF THE DRAWINGS

FIG. 3 is a diagram showing a construction example of fingerprint information 243.

FIG. 10 is a diagram showing a construction example of a candidate point calculation table in the core retrieving processing.

FIG. 11 is a diagram showing a construction example of a core retrieval result table in the core retrieving processing.

FIG. 15 is a diagram showing an example of an APDU for calling a correction vector calculating processing.

FIG. 16 is a diagram showing an example of a response APDU from the correction vector calculating processing.

FIG. 17 is a diagram showing an example of the APDU for calling a chip position calculating processing.

FIG. 18 is a diagram showing an example of the response APDU from the chip position calculating processing.

FIG. 19 is a diagram showing an example of the APDU for calling a chip matching processing.

FIG. 20 is a diagram showing an example of the response APDU from the chip matching processing.

BEST MODE FOR CARRYING OUT THE INVENTION

By taking as an example, a bank office work system requiring a high security, here will be described a case in which accesses to bank business applications run by a host computer are controlled by using IC cards as a mobile recording device. Furthermore, a case using a fingerprint as biological information will be described.

Figure 1:
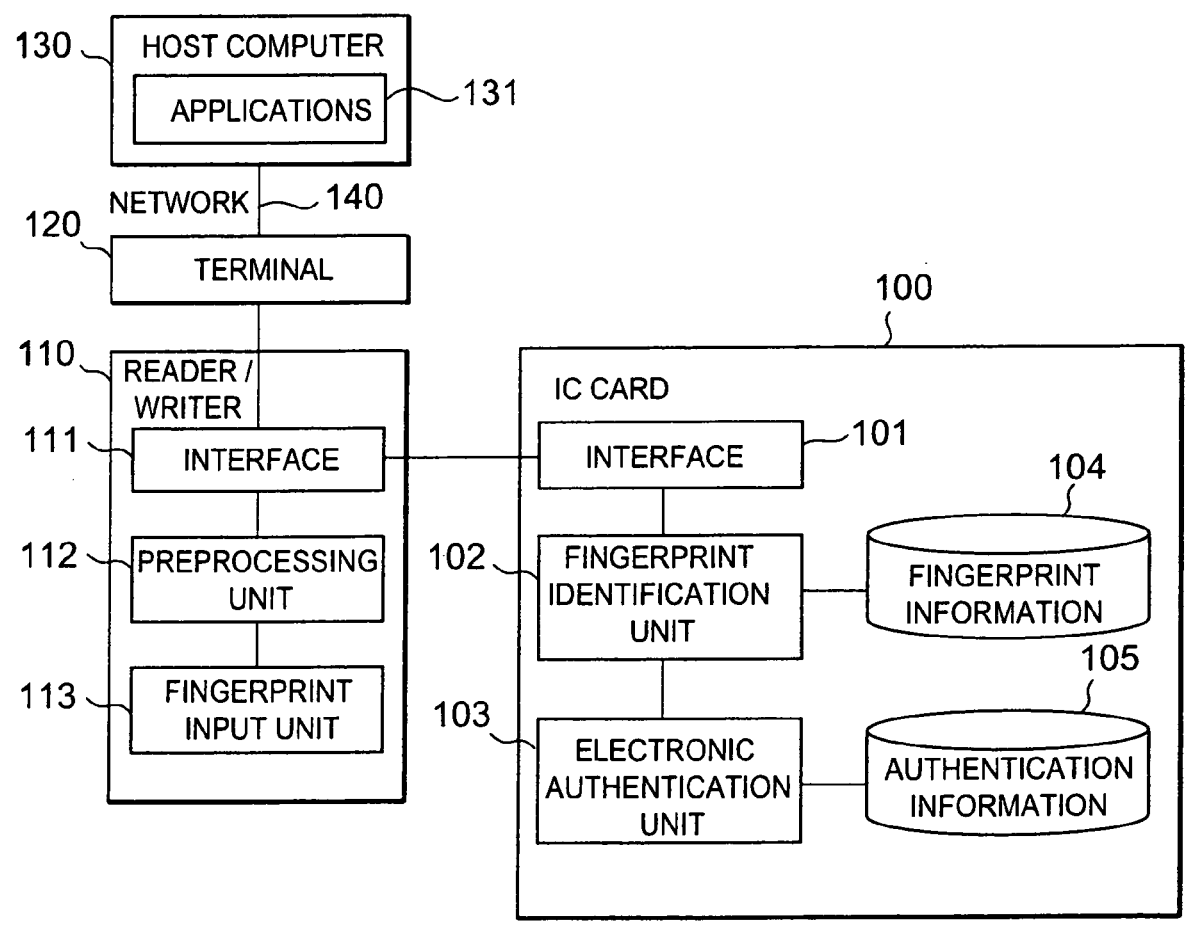
FIG. 1 is a diagram for explaining an outline of an access control system according to the present invention.

FIG. 1 is a diagram for explaining an outline of an access control system according to the present invention. As shown in FIG. 1, the present system is provided with a host computer 130, a terminal 120, a reader/writer 110 and an IC card 100.

The host computer 130 is provided for the bank business, where the applications 131 are executed for a clerk to perform the bank business. These applications 131 cannot be utilized until the clerk is confirmed (or authenticated) as a correct user registered in advance.

The terminal 120 is provided for utilizing the applications 131 and is connected with the host computer 130 through a network 140. The terminal 120 relays the exchanges of information necessary among the host computer 130, the reader/writer 110 and the IC card 100 for authenticating the correct person.

The reader/writer 110 is a device for reading and writing data from and in the IC card 100 and is connected with the terminal 120. The reader/writer 110 is equipped with an interface 111, a fingerprint input unit 113 and a preprocessing unit 112. The interface 111 transmits the information between the terminal 120 and the IC card 100. The fingerprint input unit 113 reads out the fingerprint from the finger of the clerk. The preprocessing unit 112 preprocesses the fingerprint image thus read out, and exchanges the information necessary for the fingerprint identification with the IC card 100.

This IC card 100 is a mobile storage device with a computing function, carried by each clerk. The IC card 100 is equipped with an interface 101, a fingerprint identification unit 102, an electronic authentication unit 103, fingerprint information 104 and authentication information 105. The interface 101 transmits the information to the reader/writer 110. The fingerprint identification unit 102 compares the fingerprint information recorded in the fingerprint information 104 with the fingerprint newly inputted. The electronic authentication unit 103 performs the electronic authentication with the host computer 130 by using the authentication information 105.

Next, an outline of the access control to the applications 131 in the present system will be described.

The clerk is provided with the IC card 100 which stores in advance his or her own fingerprint information 104, and connects the IC card 100, at the time of accessing to the applications 131, with the reader/writer 110 to newly input the fingerprint, using the fingerprint input unit 113 of the reader/writer 110.

When the fingerprint is inputted, the preprocessing unit 112 performs the preprocessing for the fingerprint identification. Subsequently, while the information necessary for the identification is exchanged between the preprocessing unit 112 and the fingerprint identification unit 102, it is decided whether or not the newly inputted fingerprint matches the fingerprint information 104.

If the result indicates a match, the access to the authentication information 105 of the electronic authentication unit 103 is allowed. And then, the electronic authentication is made between the applications 131 and the electronic authentication unit 103. After this electronic authentication, the access from the terminal 120 to the applications 130 is permitted, whereby the clerk can utilize the applications 131.

Next, the details of the components of the present system will be explained.

First of all, the structure of the IC card 100 will be described with reference to FIG. 2.

Figure 2:
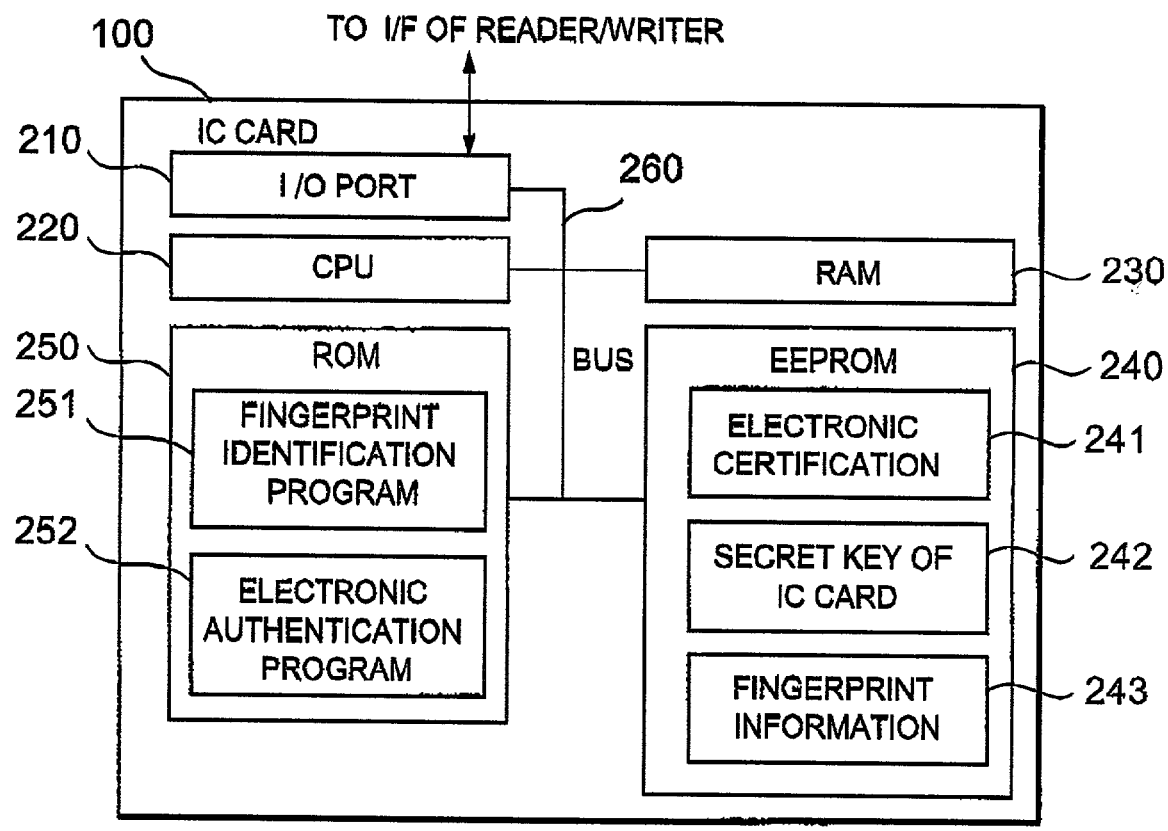
FIG. 2 is a diagram showing a structure of an IC card according to the present invention.

As shown in FIG. 2, the IC card 100 comprises an I/O port 210, a CPU 220, a RAM 230, an EEPROM 240 and a ROM 250. These individual components of the IC card 100 are connected with a bus 260 and exchange data through the bus 260.

The I/O port 210 is a port for the data exchanges with the reader/writer 110. The CPU 220 is computing processor for four arithmetical operations and bit operations. The RAM 230 is a programmable memory to be used for temporarily storing the data when the CPU 220 performs computations. The ROM 250 is a read-only-memory that stores a fingerprint identification program 251; an electronic authentication program 252, and other programs and data. The EEPROM 240 is an electrically erasable programmable nonvolatile memory and is recorded with an electronic certification 241 for certifying the validity of the IC card 100, a secret key 242 of the IC card 100, a fingerprint information 243 for verifying that the clerk is a correct IC card owner, and so on.

The fingerprint information 243 comprises the coordinates of a core of the fingerprint used for the registration, the coordinates of a predetermined number of featuring points and small images (or chip images) on the peripheries of the individual featuring points. The present embodiment will be described on the case in which the fingerprint information 243 contains thirty featuring points.

FIG. 3 is a diagram showing an example of the construction of the fingerprint information 243. As shown in FIG. 3, the fingerprint information 243 includes the number of chips (or images), the X-Y coordinates of the core, the X-Y coordinates of the chip images, and the pictorial data (or binary data) of the chip images. The method for utilizing the individual information will be described hereinafter.

The IC card 100 has a tamper-resistance for preventing unauthorized access from the outside and the data analyses by destroying the device, and is designed for preventing the data or programs stored therein from being accessed by an illegal method. Furthermore, the IC card 100 has a function to control the access to the data stored therein. In order to access the data in the IC card 100, permission by the CPU 220 is necessary such as authentication by a common key or the like. The secret key 242 of the IC card 100 is set to inhibit the access when the power of the IC card 100 is ON, so that it cannot be accessed from the external or internal programs.

Here, one IC card 100 is issued to each clerk for identifying the clerks so that only one clerk can own it.

Here, the present embodiment will be explained on the case in which the fingerprint identification program 251 and the electronic authentication program 252 are stored in the ROM 250. However, these programs can be implemented in the EEPROM 240.

Next, the structure of the reader/writer 110 will be described with reference to FIG. 4.

Figure 4:
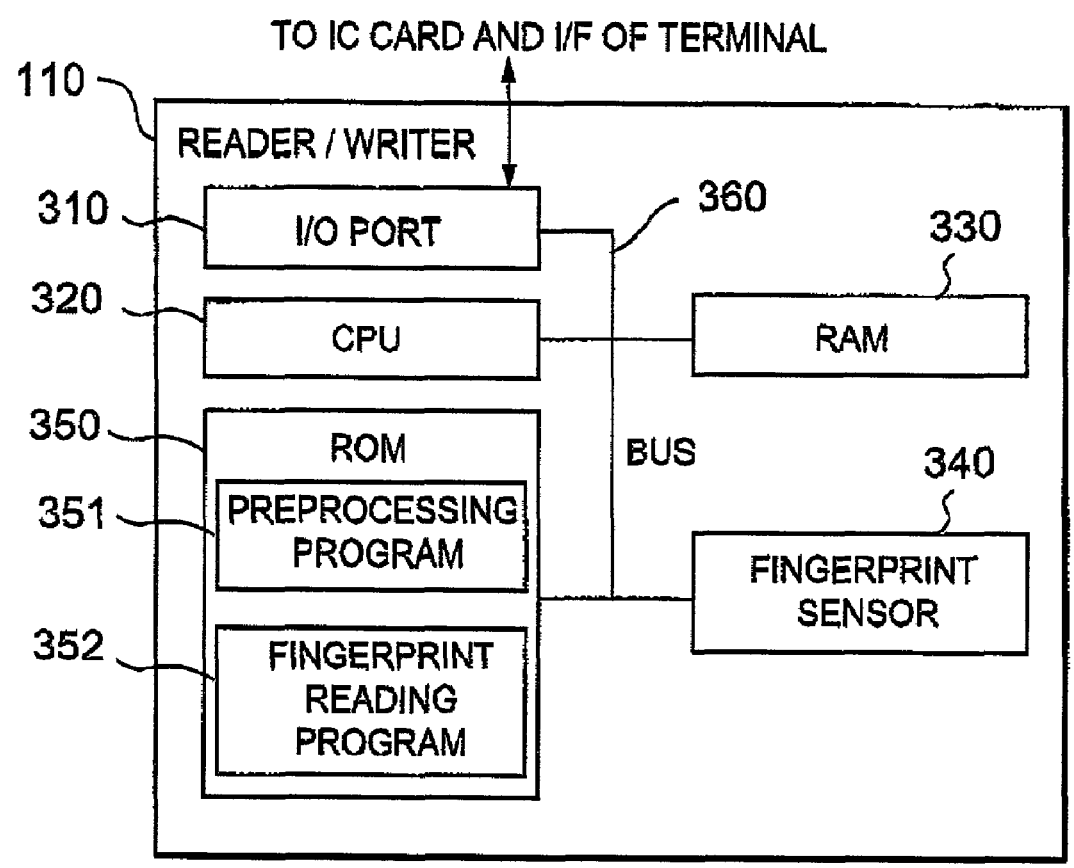
FIG. 4 is a diagram showing a structure of a reader/writer according to the present invention.

As shown in FIG. 4, the reader/writer 110 is equipped with an I/O port 310, a CPU 320, a RAM 330, a fingerprint sensor 340 and a ROM 350, These individual components of the reader/writer 110 are connected with a bus 360, through which they exchange data.

The I/O port 310 is a port for data exchanges with the IC card 110 and the terminal 120. The CPU 320 is a processor for the operations necessary for the reader/writer 110, such as four arithmetical operations and bit operations. The RAM 330 is a memory for temporarily storing the data when the CPU 320 operates. The fingerprint sensor 340 reads the fingerprint electronically.

The ROM 350 is a read only memory that stores a preprocessing program 351 for preprocessing the fingerprint image and for comparing the fingerprint through communicating with the IC card 100, a fingerprint reading program 352 for controlling the reading of the fingerprint, and other programs and data.

The reader/writer 110 has a tamper-resistance and is so designed that the data or programs stored inside may not be referred to from the outside by an illegal method.

Figure 5:
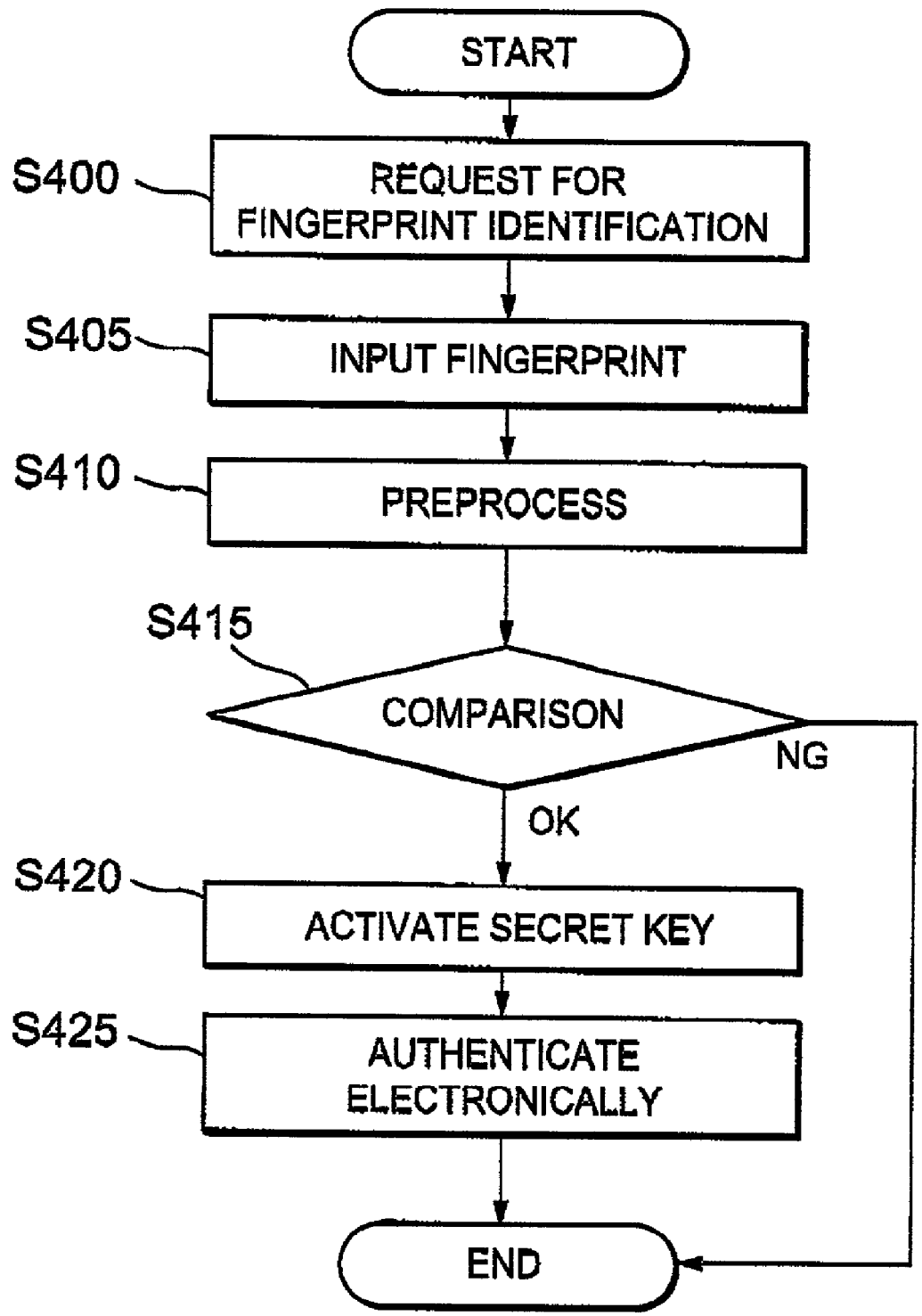
FIG. 5 is a chart showing a schematic flow for fingerprint identification.

Next, an outline of the fingerprint identification in the present embodiment will be described with reference to FIG. 5.

First of all, when the clerk utilizes the applications 131 of the host computer 130, the applications 131 request to the terminal 120 to identify the fingerprint of the clerk, and then, the terminal 120 issues a fingerprint identification request to the reader/writer 110 (S400).

Upon receipt of the fingerprint identification request from the terminal 120, the reader/writer 110 executes the fingerprint reading program 352 to obtain the fingerprint of the clerk from the fingerprint sensor 340 (S405). The fingerprint thus read is recorded in the RAM 330 as a fingerprint image having densities of 8 bits per pixel, for example. The reading of the fingerprint by the fingerprint sensor 340 is done by the ordinary method such as the method described in the aforementioned Document 2.

Next, the preprocessing program 351 preprocesses the fingerprint image, and extracts intermediate fingerprint information as required for the identification and records it in the RAM 330 (S410). The details of the preprocessing will be described below.

Next, the intermediate fingerprint information and the fingerprint information 243 of the clerk, as recorded in advance in the IC card 100, are compared by the fingerprint identification program 251 (S415). The details of the comparison will be described below.

If there is not match as a result of the comparison (S415; NG), the processing ends. On the other hand, if there is a match (S415: OK), the secret key 242 of the IC card 100 is made activated and it can be accessed from the electronic authentication program 252 (S420).

Then, the electronic authentication program 252 performs the electronic authentication with the applications 131 by using the activated secret key 242 (S425). For example, by the method described in ANSI/ITU X 509, the mutual authentication is made between the IC card 100 and the applications 131.

Next, the aforementioned preprocessing will be described in detail. The preprocessing calculates the coordinates of the core and the featuring points of the fingerprint and creates the binary image of the fingerprint, which is recorded as the preprocessed intermediate fingerprint information in the RAM 330.

Figure 6:
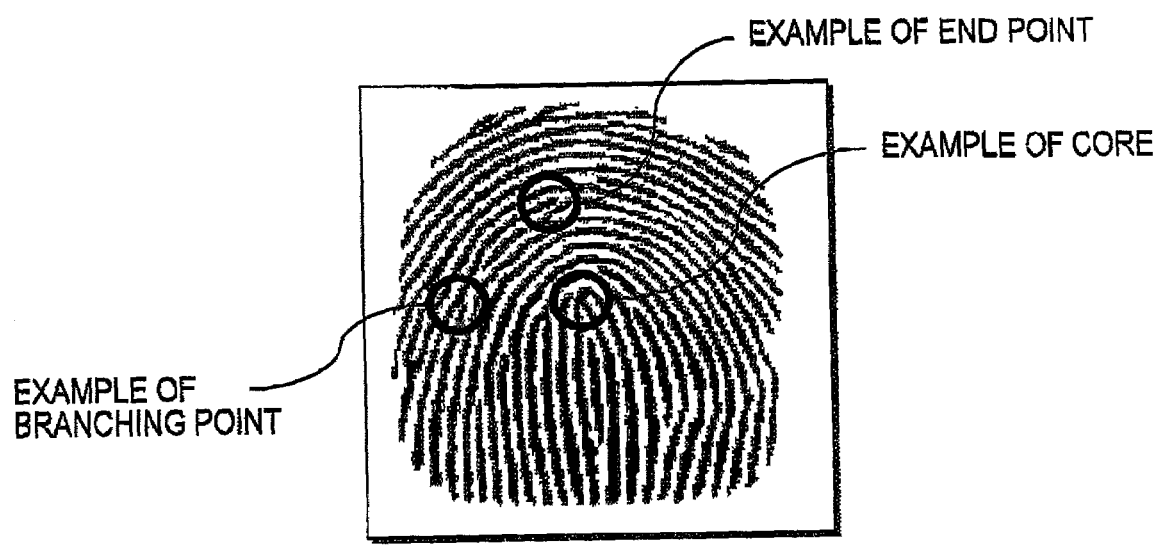
FIG. 6 is a diagram showing examples of a core and featuring points of a fingerprint.

FIG. 6 is a diagram showing examples of the core and the featuring points of the fingerprint. The core of the fingerprint indicates a featuring structure of the fingerprint, as shown in FIG. 6. The featuring points indicate the end point or the branching point of ridges (or continuations of protrusions) forming the fingerprint. Usually, each finger has one fingerprint core and a plurality of featuring points.

Figure 7:
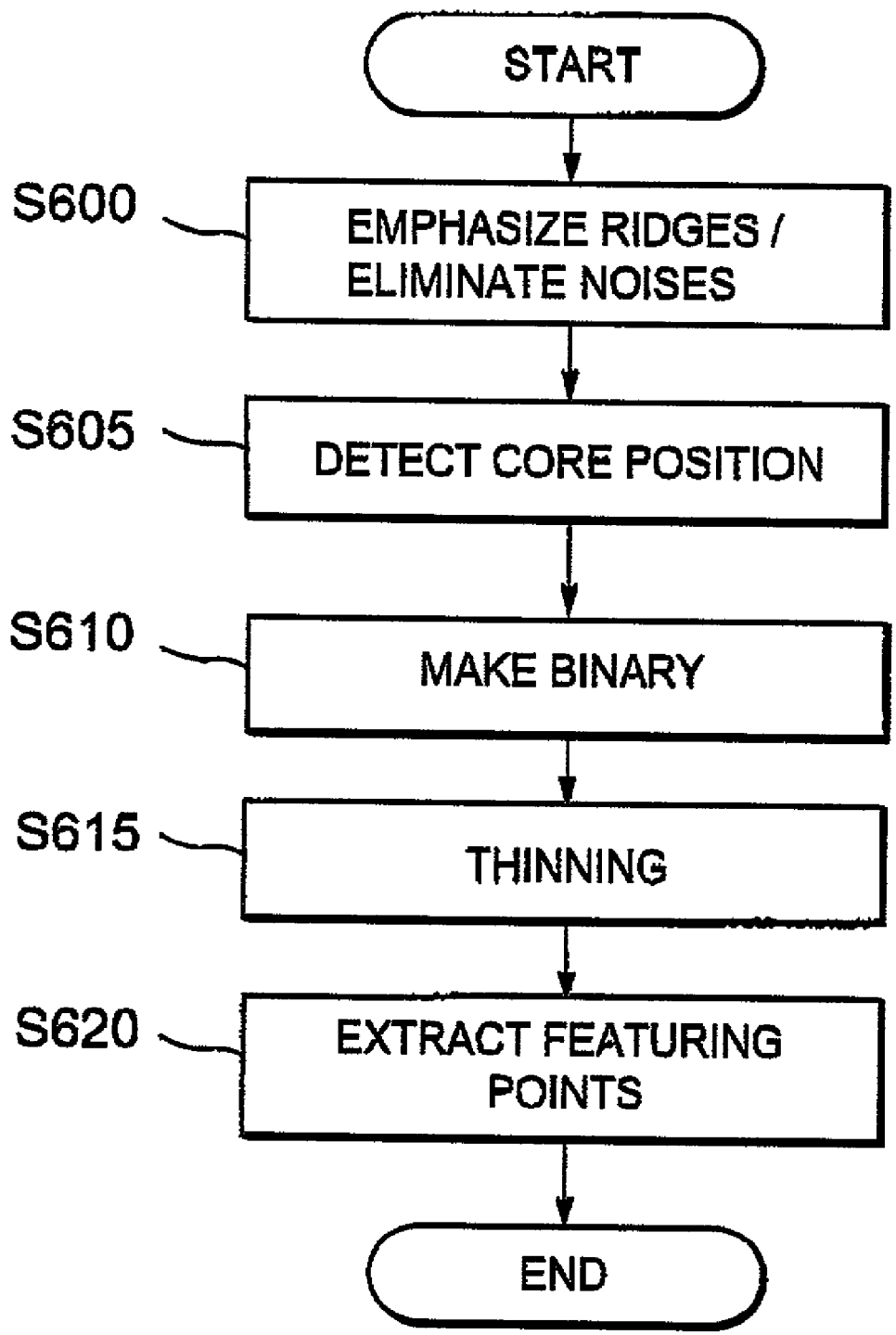
FIG. 7 is a chart showing a schematic flow a preprocessing.

FIG. 7 is a chart showing a schematic flow of the preprocessing.

First of all, the inputted fingerprint image is processed by emphasizing the ridges and eliminating the noises, and the 8-bit density fingerprint image processed is recorded in the RAM 330 (S600). The present processing is done by the method used ordinarily, such as the method described in Japanese Patent Application Laid Open No. 11-134498.

Next, the core that is a featuring structure of the fingerprint is detected, and its coordinates are recorded in the intermediate fingerprint information (S605). The details of the present processing will be described below.

Next, the 8-bit density fingerprint image thus processed by emphasizing the ridges of the like is made binary and is converted into a monochromatic image of 1 bit per pixel, and the monochromatic image is recorded in the intermediate fingerprint information (S610). The present processing is done by the method used ordinarily, such as the method described in the aforementioned Document 2.

Next, the fingerprint image thus made binary is thinned to obtain a thinned image (S615). This thinned image is temporarily recorded in the RAM 330. The present thinning processing is done by the method used ordinarily, such as the method described in Document 2.

Next, the featuring points, maximum number of thirty, such as the end points or branching points of the ridges are extracted from the thinned image, and the coordinates of the featuring points thus extracted are recorded in the intermediate fingerprint information (S620). The extraction of the featuring points is done by the method used ordinarily, such as the method described in Document 2.

Figure 8:
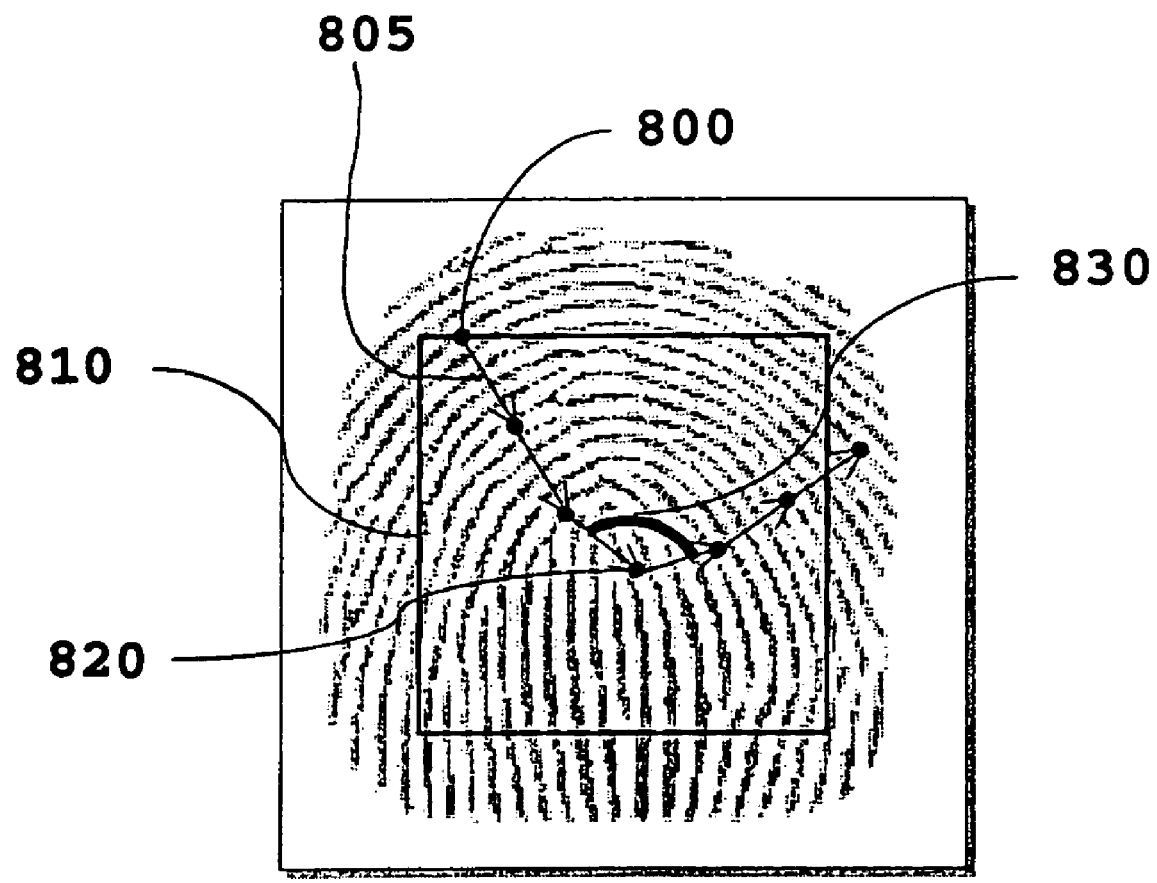
FIG. 8 is a conceptual diagram for explaining a core position detecting processing.

Next, the aforementioned core position detection S605 will be described with reference to FIG. 8. As shown in FIG. 8, at the core position detection S605, an effective region 810 for calculating the candidate point is set at first. The effective region 810 is set in the region which is located in the fingerprint image and estimated to contain the core.

Next, an initial position 800 is set arbitrarily within the effective region 810, and the following processes are repeated until the number of candidate points exceeds a predetermined value or until the next candidate point goes out of the effective region 810, the processes including to determine the normal vector 805 of the ridge at that initial position, to set as a next candidate point the position obtained by adding the determined normal vector 805 to the initial position, to determine the normal vector of the ridge at the obtained candidate point, and to determine a further next candidate point. Moreover, a curvature is calculated for each of the candidate points thus determined, and the candidate point having the maximum curvature is decided as the position of the core. By changing the initial position, moreover, the aforementioned processes are repeated so that the final core position is determined by averaging the plural core positions thus determined.

Here, twenty candidate points are retrieved at the maximum for one core retrieval, and these core retrievals are done ten times.

Figure 9:
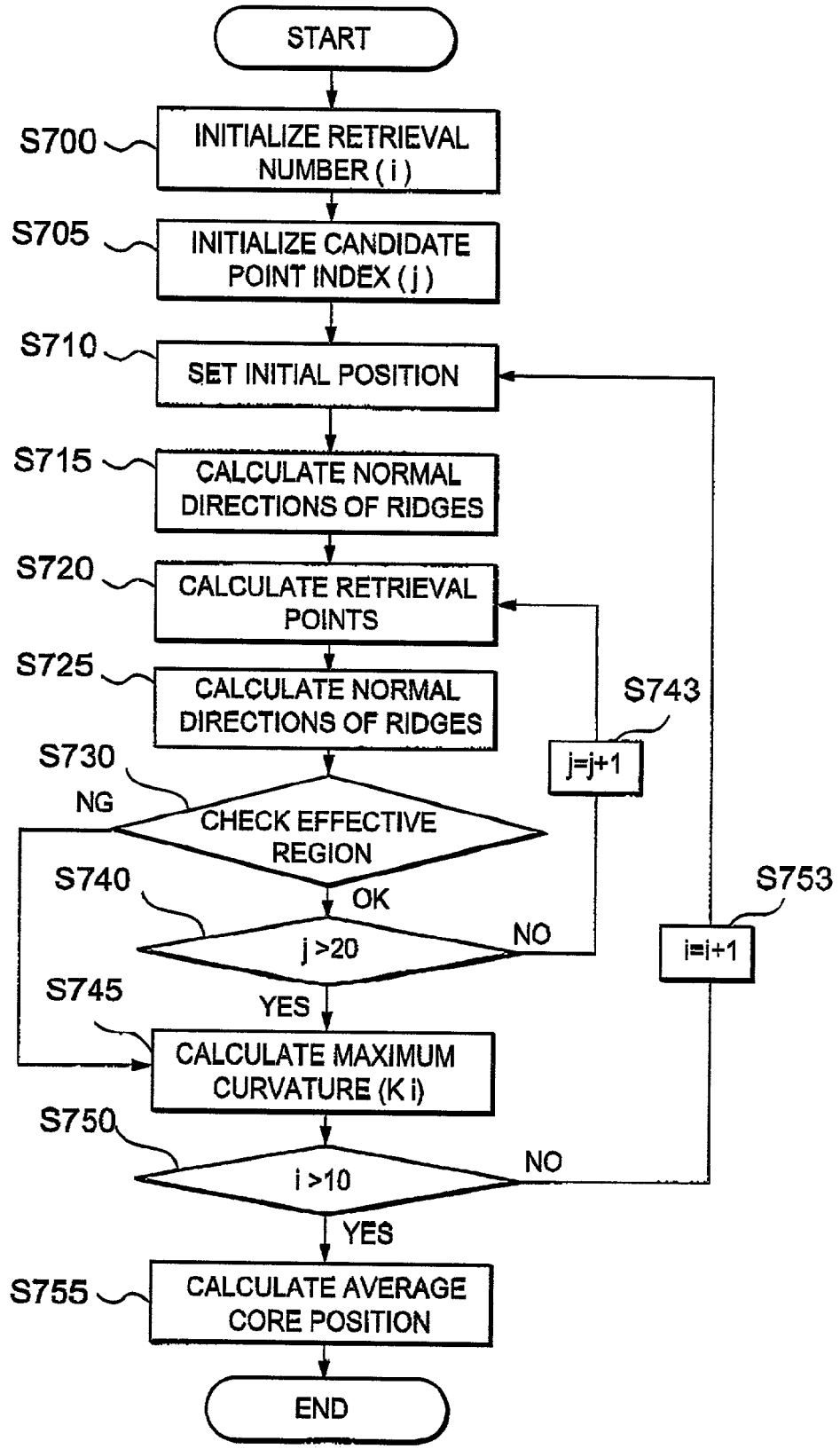
FIG. 9 is a chart showing a detailed flow of a core retrieving processing.

FIG. 9 is a chart showing a detailed flow of the core position detecting processing S605.

First of all, a counter i indicating the retrieval number is initialized to "1" (S700), and a counter j indicating the index of the candidate point in one retrieval is initialized to "1" (S705).

Next, according to the counter i indicating the retrieval number, the initial position of the candidate point is set (S710). The initial positions are set different for the individual retrievals. In the example of FIG. 8, the initial position 800 is set. The X-coordinate and the Y-coordinate of the initial position are recorded at the corresponding positions of the candidate point calculation table disposed in the RAM 330.

FIG. 10 is a diagram showing a construction example of the candidate point calculation table. As shown in FIG. 10, the candidate point calculation table has the "candidate point index", the "coordinates" of the candidate points and the "curvatures" at the individual candidate points. FIG. 10 shows the coordinates and curvatures of the seven candidate points in one retrieval. For example, the candidate point of Index 1 (or initial point) has coordinates of an X-coordinate of 25 and a Y-coordinate of 25.

Next, the normal vector 805 of the ridge at the initial position 800 is calculated (S715). This specific calculation method will be described below. The normal vector is normalized to have a preset length.

Next, a new candidate point is calculated from the position of the present candidate point and the normal vector (S720). Specifically, by adding the normal vector to the position coordinates of the present candidate point, the new candidate point is determined, and its X-coordinate and the Y-coordinate are recorded in the corresponding index of the candidate point calculation table.

Next, there is calculated the normal vector of the ridge at the new candidate point (S725).

Next, it is examined whether or not the new candidate point is within the preset effective region (or the region 810 of FIG. 8) (S730). If the candidate point is within the effective region (S730: OK), it is examined whether or not the number of candidate point has reached a preset number (=20) (S740). If the result is not reached (S740: NO), the index j indicating the candidate point is incremented by 1 (S743), and the processing returns to Step S720 of calculating the new candidate point. Then, the aforementioned operations are repeated.

On the other hand, if the number of candidate points reaches the preset value (S740: YES) or if the new candidate point is not within the preset effective region (S730: NG), the curvatures of the individual candidate points thus far calculated are obtained, and the coordinates and curvature of the candidate point having the maximum curvature are recorded at the corresponding positions of the core retrieval result table, as disposed in the RAM 330 (S745).

FIG. 11 is a diagram showing a construction example of the core retrieval result table. As shown in FIG. 11, the core retrieval result table has the "index of retrieval number" and in each retrieval, the "coordinates of points having the maximum curvatures" and the "maximum curvatures". Here, FIG. 10 shows the results after ten retrievals are completed.

The curvature may be determined by any method, but the cosine of the angle made between the normal vectors that the adjoining candidate points form is defined as the curvature. For example, the curvature of a fourth candidate point 820, as shown in FIG. 8 is calculated by the cosine of an angle 830. The curvatures of all candidate points are thus calculated, and the coordinates of the candidate point having the maximum curvature are recorded at the corresponding positions of the core retrieval result table. In the example shown in FIG. 10, the curvature of −0.3 is the maximum, so that the coordinates and the curvature of the fourth candidate point are recorded at the position corresponding to Index 1 of FIG. 11.

When the maximum curvature of the candidate points retrieved at this time is calculated, it is decided whether or not the retrieval number i exceeds a preset number (=10)

(S750). If it does not exceed, the retrieval number i is incremented by 1 (S753), and the processing returns to Step S710 of setting the initial position of the next retrieval. Then, the aforementioned operations are repeated.

On the other hand, if the retrieval number exceeds the preset number (=10), the coordinates of the core are calculated from all the retrieval results (S755).

The calculations of the core coordinates are done by the method of determining the core position by averaging the coordinates of the candidates of the cores determined by all the retrievals, or by the method of determining the core position by averaging only the candidate points having values no less than a threshold value of the predetermined maximum curvature. For example, if the threshold value of the maximum curvature is −0.5 and if the candidates having the maximum curvatures no more than the threshold value are nullified, in the example of FIG. 11, the candidate point by the tenth retrieval is nullified because its maximum curvature is −0.8, and the core position is calculated by averaging those of the first to ninth retrievals.

Next, the aforementioned method of calculating the normal vector of the ridge will be described. At first, the normal vector of the ridge is calculated by calculating the ridge direction (or the direction in parallel with the ridge) at the candidate point and by calculating a direction perpendicular to the ridge direction.

Therefore, here will be described the method of calculating the ridge method.

Figure 12:
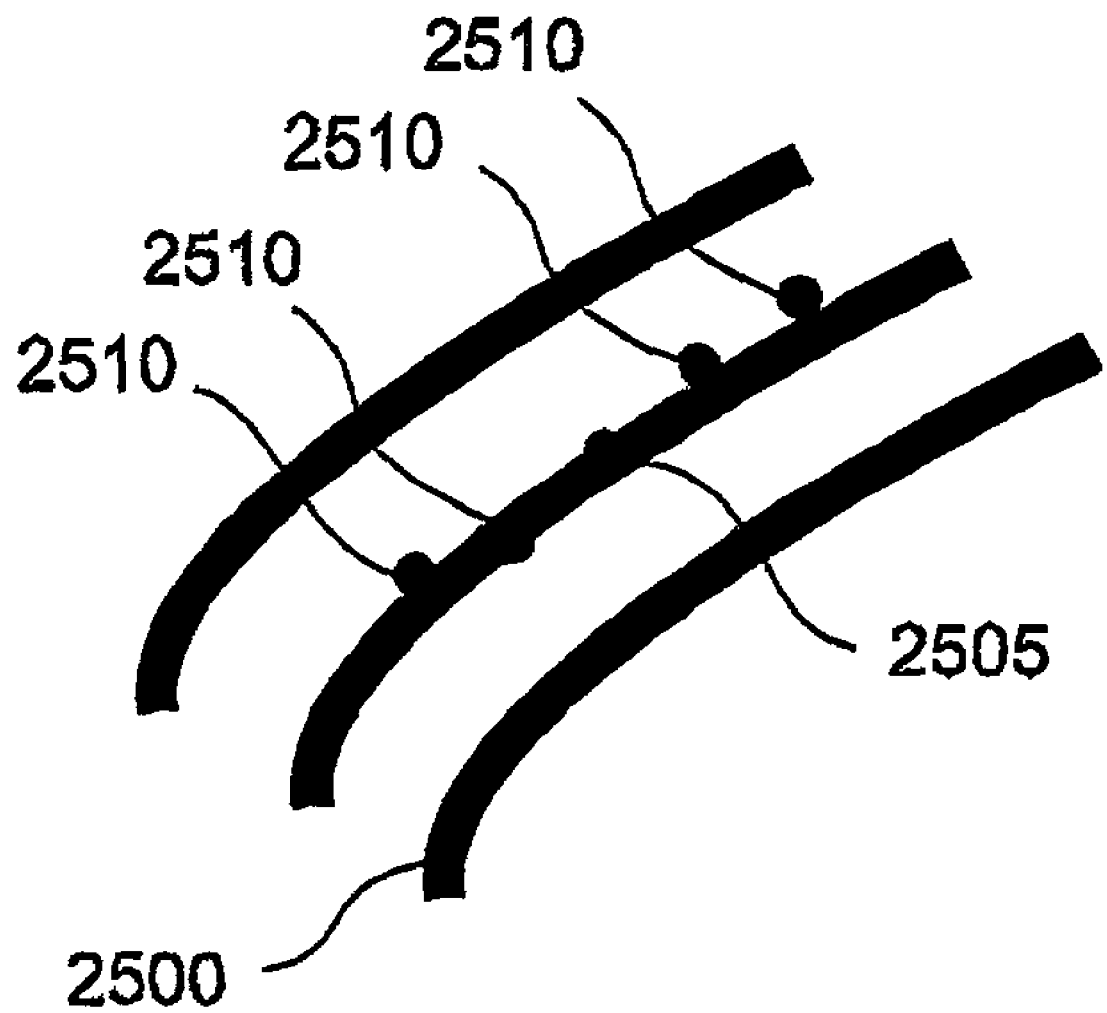
FIG. 12 is a conceptual diagram of a ridge direction calculating method.

FIG. 12 is a diagram showing the conception of a ridge direction calculating method in the present embodiment. FIG. 12 shows a portion of the fingerprint image in which the ridges are expressed by solid lines. The ridge direction at a point 2505 on a pixel where the fingerprint image is present can be calculated in the following manner. First of all, a plurality of points 2510 are set on a straight line passing through the point 2505. Next, all the absolute values of the differences between the luminance of the point 2505 and the luminance of the individual points 2510 are added. These operations are performed in a plurality of directions, and it is decided that the direction of the smallest value matches the ridge direction.

Figure 13:
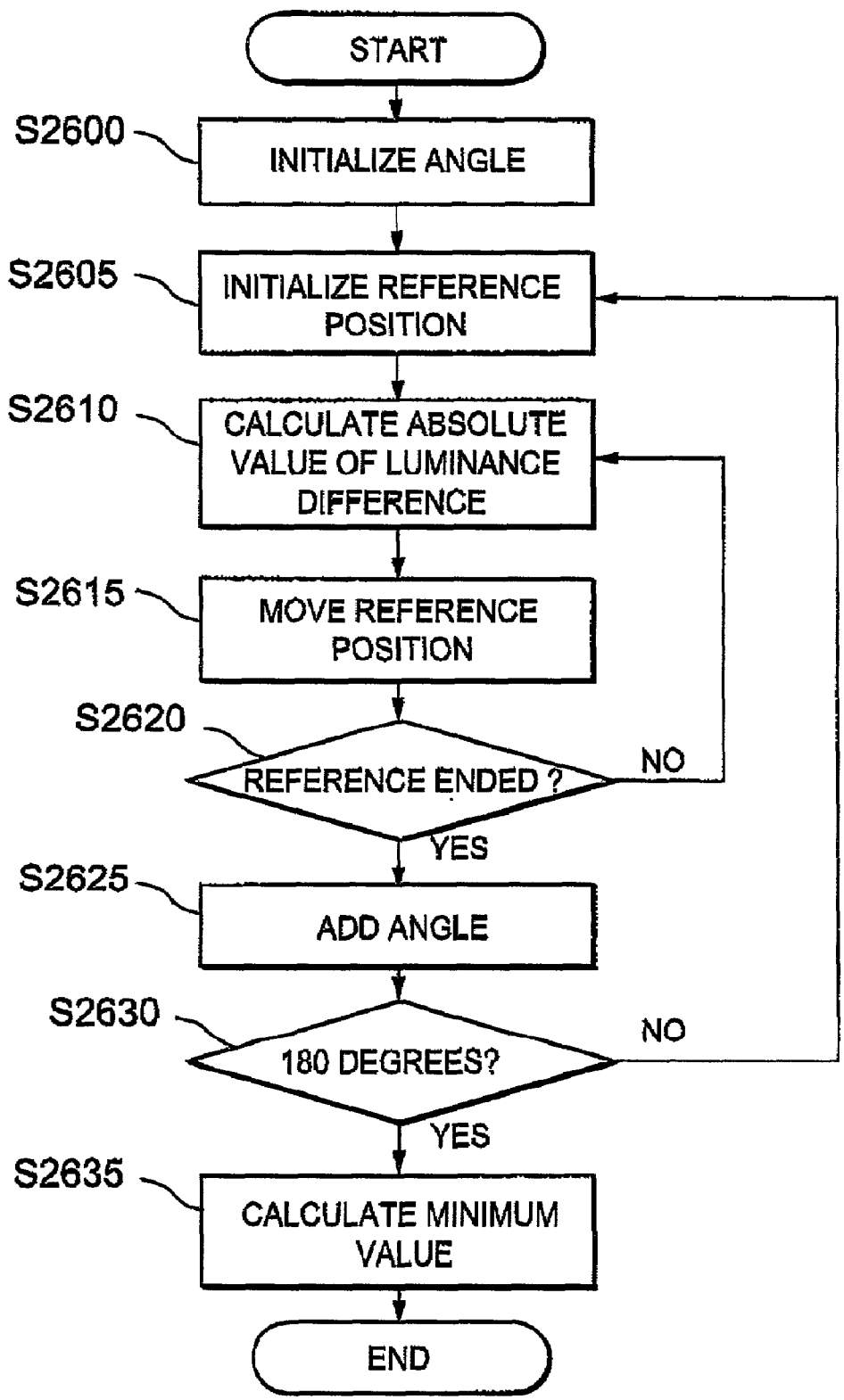
FIG. 13 is a chart showing a detailed flow of the ridge direction calculating processing.

FIG. 13 is a chart showing a processing flow of the ridge direction calculating processing.

First of all, the angle is initialized to 0 degrees (S2600) Here, the processing is performed on the individual angles of every 20 degrees from 0 degrees to 160 degrees. Further, the values of evaluations of the individual angles are initialized to 0.

Next, the position of the reference point is initialized, and its coordinates are calculated (S2605). Specifically, the reference point is on the straight line passing through the point (as will be called the "standard point") such as the points 2505 of FIG. 12 for calculating the ridge direction. Here, the four points are used as the reference points, as shown in FIG. 12.

Next, the absolute value of the difference between the luminance of the reference point and the luminance of the standard point is calculated and added to the evaluation values assigned to the corresponding angles (S2610).

Next, the reference point is moved, and its coordinates are calculated (S2615).

Next, it is discriminated whether or not all the reference points have been processed (S2620). If the processes of all the reference points do not end (S2620: NO), the processing returns to Step S2610, and the aforementioned operations are repeated.

If processes end with regard to all the reference points (S2620; YES) 20 degrees are added to the angle (S2625), and it is decided whether or not the angle reaches 180 degrees (S2630). If the angle does not reach 180 degrees (S2630; NO), the processing returns to Step S2605, and the aforementioned operations are repeated.

If the angle reaches 180 degrees (S2630:YES), the angle having the minimum evaluated value out of the evaluated values assigned to the individual angles (S2635) is calculated. The angle having the minimum value determines the direction of the ridge at the standard point.

In the core position detecting processing in the present embodiment, as has been described hereinbefore, the position of the core can be detected in a small quantity of calculations by retrieving the normal vector of the ridge when the core is detected, and by determining the core position by majority operation, where the normal vector largely changes.

Here will be described the comparison processing in the present embodiment.

Figure 14:
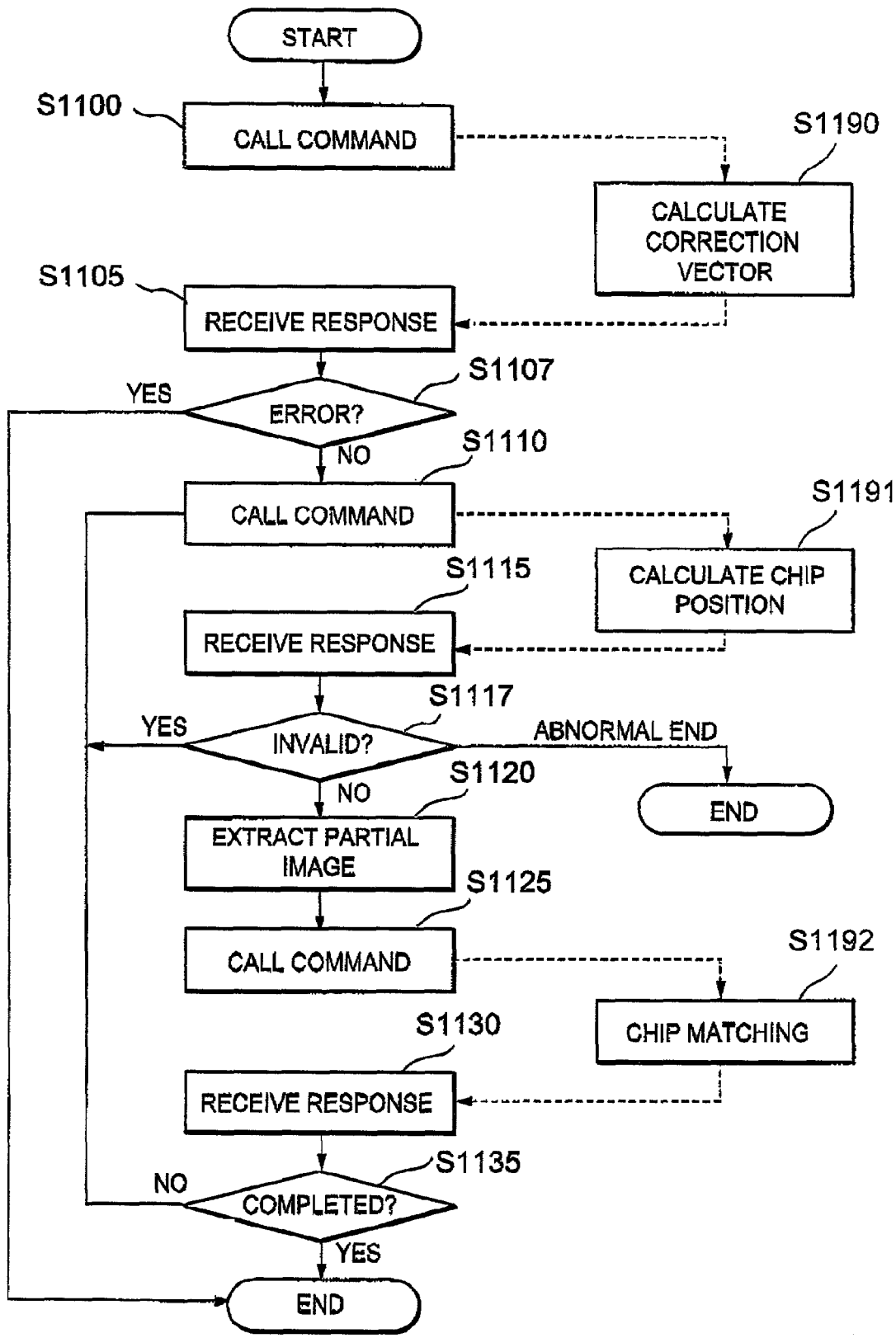
FIG. 14 is a chart showing a schematic flow of comparing processing.

FIG. 14 is a chart showing a schematic flow of comparison in the present embodiment. The present processing is performed while the reader/writer 110 and the IC card 100 being communicating with each other. Therefore, the processing of the reader/writer 110 is shown on the left side of FIG. 14, and the processing of the IC card 100 is shown on the right side.

As shown in FIG. 14, the processing to be done by the IC card 100 includes a correction vector calculating processing S1190, a chip position calculating processing S1191, and a chip matching processing 1192. These steps are individually implemented in the IC card 100 as commands defined by ISO7816-4.

First of all, the reader/writer 110 calls the correction vector calculating processing S1190 of the IC card 100 (S1100). At this time, the coordinates of the core of the inputted fingerprint, as recorded in the intermediate fingerprint information, are transferred as parameters. Specifically, the APDU (Application Protocol Data Unit) described in ISO7816-4 is transmitted to the IC card 100 to call the processing.

FIG. 15 is a diagram showing an example of the APDU for calling a correction vector calculating processing. As shown in FIG. 15: the command ID of the correction vector calculating processing is substituted for the INS field of the APDU 1500; the X-coordinate and the Y-coordinate of the core are substituted for the data field; and the data length of the coordinates are substituted for the Lc field.

The IC card 100 starts the correction vector calculating processing (S1190) when it receives the APDU 1500 from the reader/writer 110. In the correction vector calculating processing, the differential vector between the coordinates of the core of the input fingerprint received from the reader/writer 110 and the core position of the registered fingerprint recorded in advance in the IC card 100 is calculated as the correction vector expressing the positional displacement between the two and is recorded in the RAM 230 of the IC card 100. After this, the reader/writer 110 is responded. Specifically, the reader/writer 110 is responded by outputting thereto the response APDU (Response Application Protocol Data Unit) described in ISO7816-4.

FIG. 16 is a diagram showing an example of a response APDU from the correction vector calculating processing S1190. As shown in FIG. 16, a response APDU 1510 includes the status of a command in an SW1 field, in which a code indicating a normal end or an abnormal end is substituted for the processing result of the command. The details of the correction vector calculating processing S1190 will be described below.

When the reader/writer 110 receives the response APDU 1510 from the IC card 100 (S1105), the reader/writer 110 checks the status of the response APDU 1510 (S1107). If the result is an error (S1107: YES), the processing ends.

If not the error (S1107: NO), the chip position calculating processing is called so as to acquire the coordinates to cut out the partial image of the input fingerprint to be subjected to the chip matching (S1110).

FIG. 17 is a diagram showing an example of the APDU to be transmitted to the IC card 100 to call the chip position calculating processing. As shown in FIG. 17, the command ID of the chip position calculating processing is substituted for the INS field of an APDU 1520, and the data length of the coordinates for a return value is substituted for an Le Field.

The IC card 100 starts the chip position calculating processing when it receives the APDU 1520 from the reader/writer 110 (S1191). In the chip position calculating processing, the coordinates of the featuring points in the input fingerprint are calculated from the coordinates of the featuring points of the registered fingerprint recorded in advance and the correction vector calculated at Step S1190. Specifically, the coordinates of the featuring points in the input fingerprint are calculated by adding the correction vector to the coordinates of the featuring points of the registered fingerprint. After this, the reader/writer 110 is responded by using the response APDU.

FIG. 18 is a diagram showing an example of the response APDU from the chip position calculating processing S1191. As shown in FIG. 18, the coordinates of the featuring point are substituted for the data field of a response APDU 1530, and the status of a command is substituted for the SW1 field, The chip position calculating processing S1191 will be described in detail.

The reader/writer 110 analyzes, when it receives the response APDU 1530, the content of the response APDU 1530 and examines whether or not it is an abnormal end, and whether or not the position of the designated featuring point is invalid (S1117). If the position of the designated featuring point is invalid (S1117: YES), the processing returns to Step S1110, at which the chip position calculating processing is called for another chip image. On the other hand, in the case of abnormal end (S1117:Abnormal End), the processing ends.

If the position of a proper featuring point is obtained (S1117: NO), the partial image in the periphery of the coordinates, which are designated by the chip position calculating processing, is cut out (S1120). The partial image is slightly larger than the chip image, and its size and shape are determined in advance.

Next, the chip matching processing of the IC card 100 is called (S1125). At this time, the partial image extracted at Step S1120 is transmitted as data. The specific calling method is similar to that of Step S1100.

FIG. 19 is a diagram showing an example of the APDU for calling the chip matching processing. As shown in FIG. 19: the command ID of the chip matching processing is substituted for the INS field of an APDU 1540; the data length of the partial image is substituted for the Lc field; and the partial image is substituted for the data field.

The IC card 100 starts the chip matching processing when it receives the APDU 1540 from the reader/writer 110 (S1192). The chip matching processing is done between the partial image of the input fingerprint received and the chip image recorded in advance in the IC card 100. If they are matched, the matching number of the chip is incremented. When the matchings with regard to all featuring points are completed, a response is made as to the status indicating match or mismatch of the fingerprint. Otherwise, a response is made as to the status indicating to perform matching as to next featuring point.

FIG. 20 is a diagram showing an example of the response APDU from the chip matching processing. As shown in FIG. 20, the status of the command is substituted for the SW1 field of a response APDU 1550. Specifically, match or mismatch of the fingerprint or the code indicating the process continuation is substituted for as the processed result of the command. The details of chip matching processing S1192 will be described below.

When the reader/writer 110 receives the response APDU 1550 of the chip matching processing, the reader/writer 110 analyzes the status of the response APDU 1550 and decides whether or not the processing ends (S1135) If the result of match or mismatch of the fingerprint is obtained (S1135: YES), the processing ends. Otherwise, the processing returns to Step S1110, at which the matching is made for the remaining featuring points.

Figure 21:
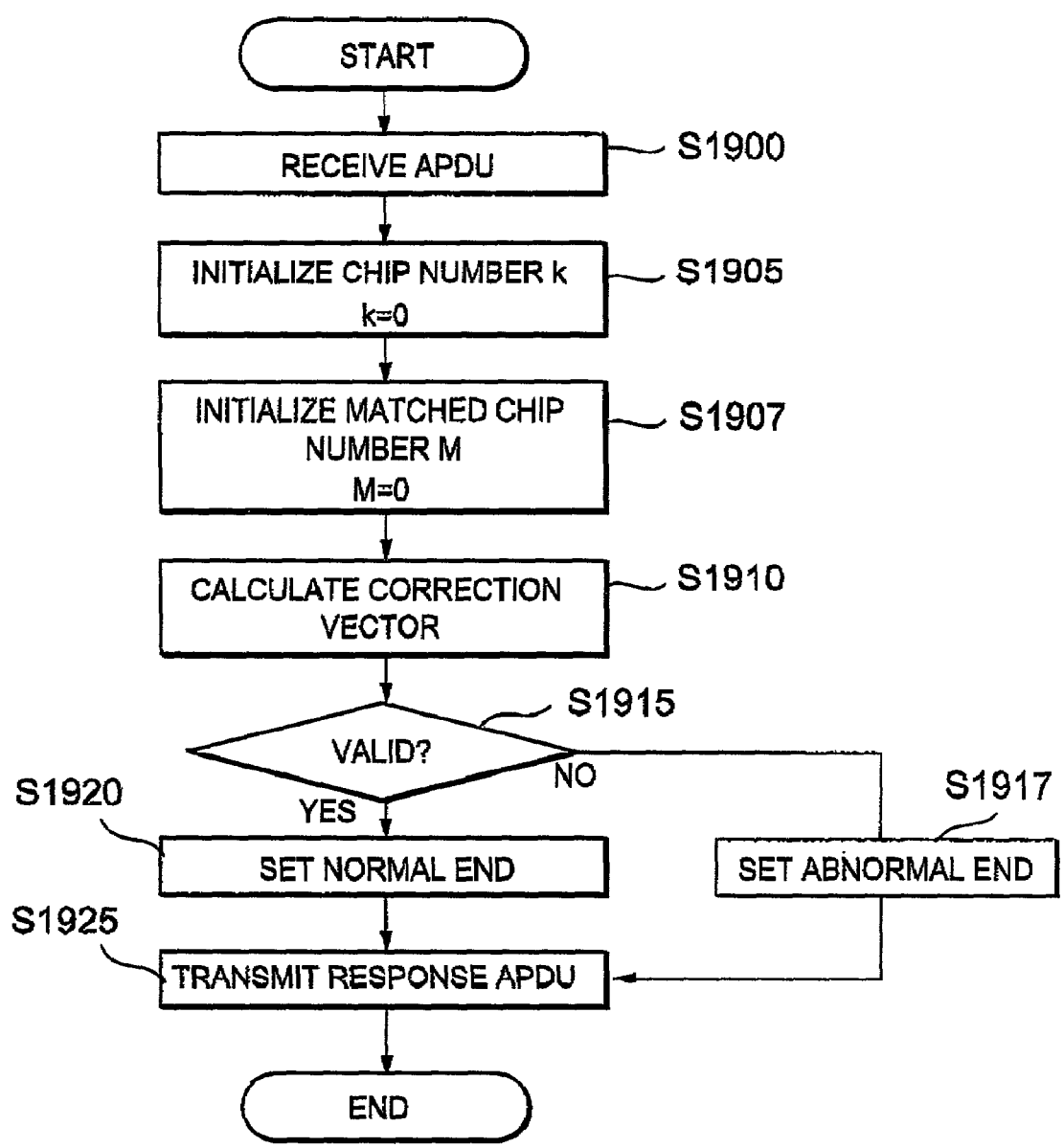
FIG. 21 is a chart showing a detailed flow of the correction vector calculating processing.

Next, with reference to FIG. 21, the aforementioned correction vector calculating processing S1190 will be described.

The IC card 100 records, when it receives the APDU 1500 from the reader/writer 110, the X-coordinate and the Y-coordinate, as indicating the core position of the image to be compared contained in the APDU 1500, in the RAM 230 (S1900).

Next, an index (or a chip image index) k of the chip image for the chip matching is initialized to 0 (S1905), and a variable M indicating a matching chip number is initialized to 0 (S1907).

Next, the correction vector is calculated by using the core position of the image to be compared that is sent from the reader/writer 110 and the coordinates of the core of the fingerprint information (FIG. 3) recorded in advance in the IC card 100 (S1910). Specifically, the correction vector is calculated by subtracting the coordinates of the core of the fingerprint information from the coordinates of the core of the image to be compared.

Next, the magnitude of the correction vector thus calculated is validated (S1915). If the valid correction vector is obtained (S1915: YES), the code indicating the normal end is substituted for the status of the response APDU (S1920), and this response APDU is transmitted to the reader/writer 110 (S1925). On the otherhand, if the invalid correction vector is obtained (S1915: NO), a code indicating the abnormal end is substituted for the status of the response APDU (S1917), and this response APDU is transmitted to the reader/writer 110 (S1925).

As described above, the correction vector calculating processing S1190 is performed.

Next, the aforementioned chip position calculating processing S1191 will be described.

Figure 22:
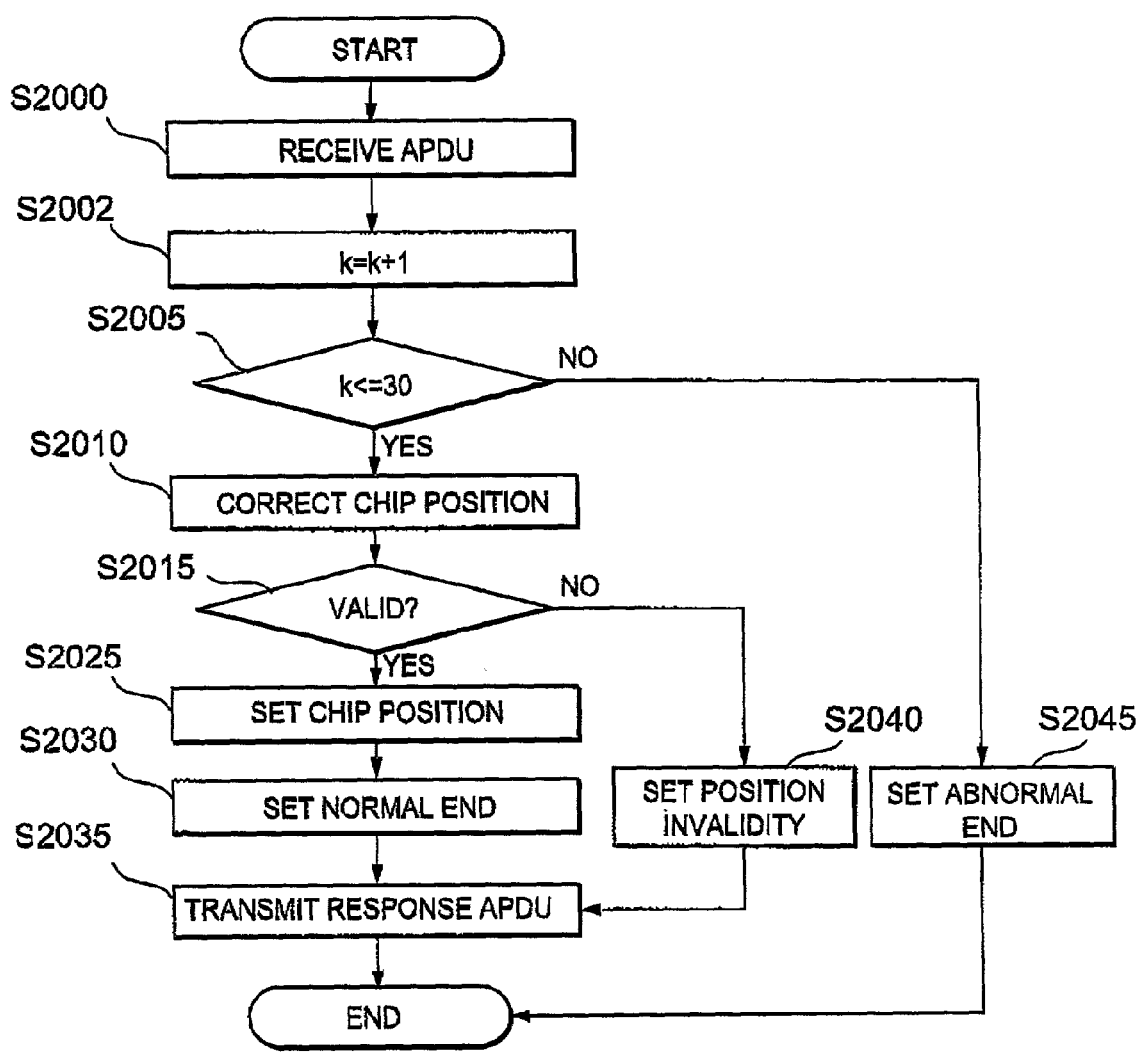
FIG. 22 is a chart showing a detailed flow of the chip position calculating processing.

FIG. 22 is a chart showing a detailed flow of the chip position calculating processing S1191.

When the IC card 100 receives the APDU 1520 for starting the chip position calculating processing S1191 from the reader/writer 110 (S2000), it increments the chip image index k (S2002), and decides whether or not the chip image index k is no more than the number (=30) of the chips recorded in the fingerprint information (S2005). If the index k is larger than the number of chips recorded in the fingerprint information (S2005: NO), a code indicating the abnormal end is substituted for the status of the response APDU (S2045), and this response APDU is transmitted to the reader/writer 110 (S2035). Then, this processing ends.

If the chip image index k is no more than the number of the chip images recorded in the fingerprint information (S2005: YES), the coordinates of the k-th chip image recorded in the fingerprint information are corrected (S2010). Specifically, this correction is made by adding the correction vector to the coordinates of the k-th chip image.

Next, it is validated whether or not the coordinates of the corrected chip are contained in the image to be compared (S2015). If it is not contained (S2015: NO), the code indicating the position invalidation of the featuring point is substituted for the status of the response APDU (S2040), and this response APDU is transmitted to the reader/writer 110 (S2035). Then, the processing ends.

If the coordinates of the corrected chip are contained in the image to be compared (S2015: YES), the coordinates of the corrected chip are substituted for the data field of the response APDU (S2025). Moreover, the code indicating the normal end is substituted for the status of the response APDU (S2030), and this response APDU is transmitted to the reader/writer 110 (S2035), and the processing ends.

As described above, the chip position calculating processing S1191 is performed.

Figure 23:
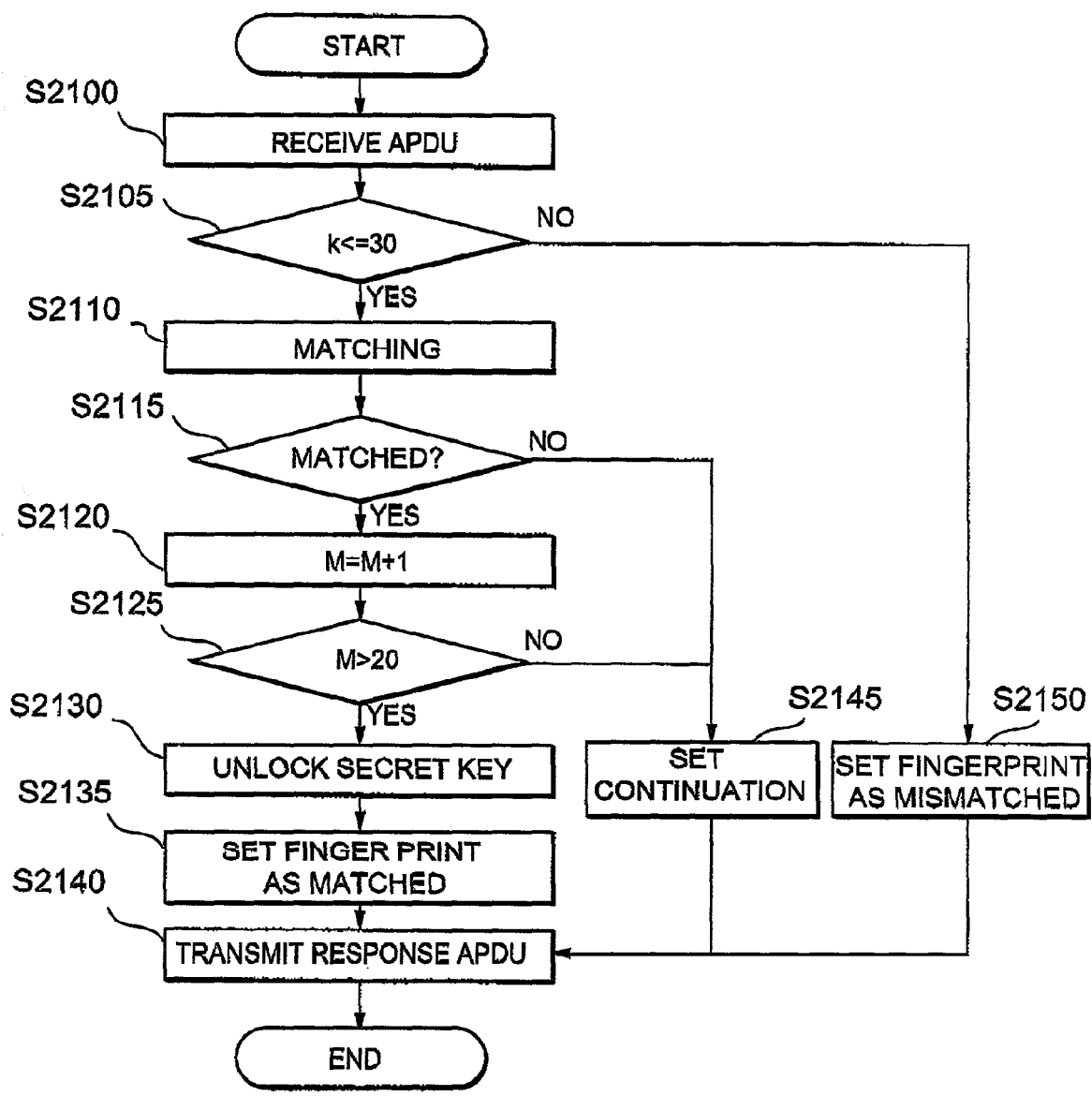
FIG. 23 is a chart showing a detailed flow of the chip matching processing.

Next, the aforementioned chip matching processing S1192 will be described with reference to FIG. 23.

When the IC card 100 receives the APDU 1540 for starting the chip matching processing S1192 from the reader/writer 110, it records the partial image, as recorded in the data field, in the RAM 230 (S2100).

Next, it is validated whether or not the chip image index k is no more than the number (=30) of the chips recorded in advance in the fingerprint information (S2105). If the index k is larger than the chip number (S2105: NO), the code indicating mismatch of the fingerprint is substituted for the status of the response APDU (S2150), and this response APDU is transmitted to the reader/writer 110 (S2140).

If the index k is no more than the chip image number (S2105: YES), the matching between the partial image and the k-th chip image is made (for the chip matching) to output a code indicating whether or not the partial image matches the chip image (S2110). The specific method of this matching will be described hereinafter.

Next, it is examined whether or not the chip image matches the partial image (S2115). In the case of mismatch (S2115: NO), the code indicating to continue comparison is substituted for the status of the response APDU (S2145), and this response APDU is transmitted to the reader/writer 110 (S2140).

If the chip image matches the partial image (S2115: YES), the matching chip number X is incremented (S2120), and it is decided whether or not the matching chip number M is larger than a predetermined threshold value (=20) (S2125). If the number M is no more than the threshold value (S2125: NO), the code indicating to continue comparison is substituted for the status of the response APDU, and this response APDU is transmitted to the reader/writer 110 (S2140).

If the number M is larger than the threshold value (S2125: YES), it is decided that the image to be compared matches the fingerprint information recorded in advance in the IC card 100, and the secret key 242 for the IC card 100 to perform the mutual authentications is made available (S2130).

Next, the code indicating a match of the fingerprint is substituted for the status of the response APDU (S2135), and this response APDU is transmitted (S2140). Then, the processing ends.

Next, the matching Step S2110 to be done at the aforementioned chip matching step S1192 will be described in detail.

Figures 24, 25:
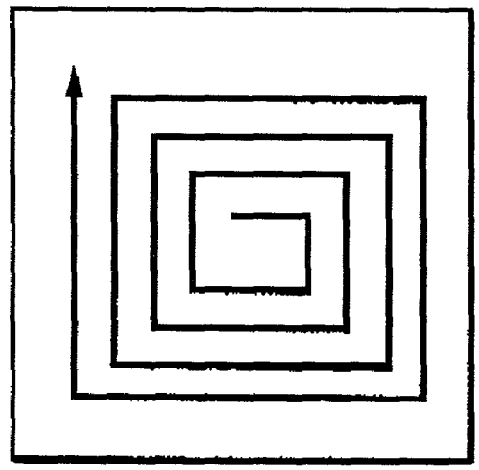
FIG. 24 is a diagram showing a conception of the chip matching processing.
FIG. 25 is a diagram showing a construction example of mismatched bit number retrieval table.

In the present processing, as shown in FIG. 24, the partial image is traced along a helical orbit to decide whether or not a portion of the partial matches the chip image, Here, the orbit may not be helical.

In the present embodiment, the mismatched bit number retrieval table is prepared in advance in the ROM 250 or the EEPROM 240 so that it may be utilized when the number of mismatched bits at the time of comparing the chip image and the partial image is counted.

FIG. 25 is a diagram showing a construction example of the mismatched bit number retrieval table. As shown in FIG. 25, the present table records the number of 1 when the index is expressed by binary digits. For example, the numeral 2 is recorded for an index number 3 (=11b), and the numeral 1 is recorded for an index 4 (=100b) Here, a table of 256 elements from 0 to 255 is prepared for comparing the chip image and the partial image at the unit of 8 bits.

Figure 26:
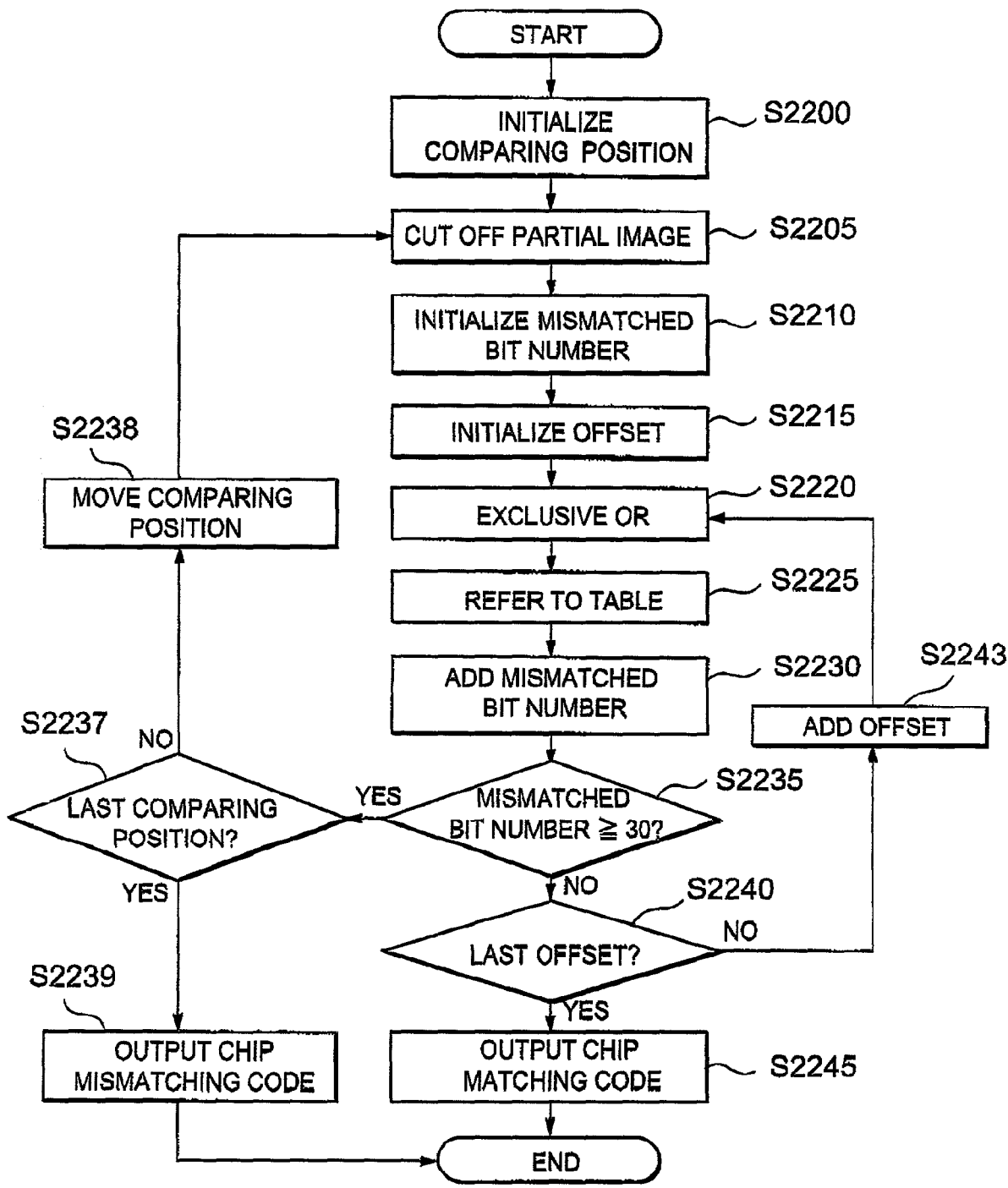
FIG. 26 is a chart showing a detailed flow of the matching processing.

FIG. 26 is a chart showing a detailed flow of the matching step S2110.

First of all, a comparing position on the partial image is initialized (S2200). For example, the position where the chip image is located at the central portion of the partial image is set as the first comparing position.

Next, according to the comparing position, an image of the same size as that of the chip image is cut out from the partial image and is copied in a buffer for an image to be compared, the buffer being retained on the RAM 230 (S2205). If the chip image has a size of a square of 16 pixels, for example, the necessary buffer for the image to be compared is 256 bits, i.e., 32 bytes because 1 pixel corresponds to 1 bit. In this case, the chip image also has a region of 32 bytes and is stored as a portion of the fingerprint information in the EEPROM 240.

Next, the mismatched bit number indicating the number of bits, as a mismatch between the chip image and the buffer for the image to be compared, is initialized to 0 (S2210), and an offset indicating the comparison target position between the chip image and the buffer for the image to be compared is initialized to 0 (S2215).

Next, an exclusive OR is taken between the data of the offset positions of the chip image and the buffer for the image to be compared, and the result is stored in the RAM 230 (S2220). Here, the exclusive OR is taken at the unit of 1 byte.

Next, the number, as obtained by using the result of the exclusive OR as the index and by referring to the mismatched bit number retrieval table, is added to the mismatched bit number (S2230).

Next, it is decided whether or not the mismatched bit number is no less than a predetermined threshold value (=30) (S2235). If the mismatched bit number is less than the predetermined threshold value (S2235: NO), calculations are done for all the data of the chip image and the buffer for the image to be compared, to examine whether or not the offset reaches the last (S2240). If the last is not reached (S2240: NO), the offset is incremented by 1 (S2243), and the processing returns to Step S2220 for taking the exclusive OR between the chip image indicated by the offset and the buffer for the image to be compared. Then, the aforementioned operations are repeated.

On the otherhand, if the offset reaches the last (S2240: YES), the code indicating the chip image matches the partial image is outputted (S2245) and the processing ends.

If it is decided at Step S2235 that the mismatched bit number is no less than the predetermined threshold value (S2235: YES), it is examined (S2237) whether or not the comparison is performed for all over the partial image. If there is a position that is has not been compared yet (S2237: NO), the comparing position is moved thereto (S2238), and the processing returns to Step 2205. Then, the aforementioned operations are repeated.

If the comparison comes to the last (S2237; YES), a code indicating that the chip fails to match the partial image is outputted (S2239), and the processing ends.

The chip matching processing is thus done.

In the foregoing description, in the comparing processing, the correction vector is calculated by using the position of the core of the fingerprint but may be calculated by another method.

Next, here will be described the method for calculating the correction vector by using the relative correlation of the distribution of the featuring points. In this case, the detection or the like of the core position need not be done in the aforementioned preprocessing or the like.

Here will be described the case, in which the correction vector is calculated in the IC card 100, and the case in which the correction vector is calculated in the reader/writer 110. First of all, here will be described the case the correction vector is calculated in the IC card 100.

This case is different from the aforementioned comparing processing only in the APDU to be transmitted by the reader/writer 110 to the IC card 100 in step 1100 of FIG. 14 and in the contents of the correction vector calculation processing S1190 to be called by the APDU.

Figure 27:
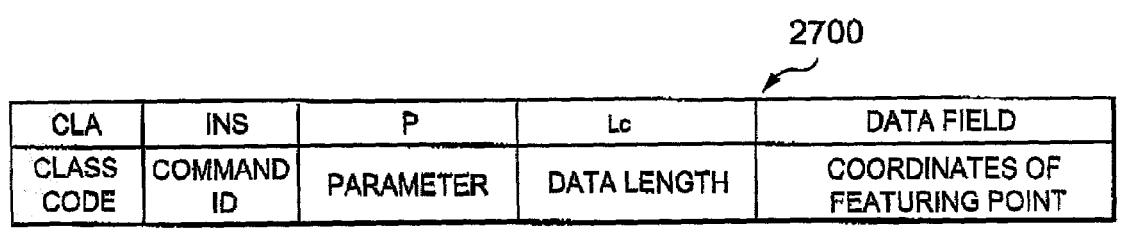
FIG. 27 is a diagram showing an example of the APDU for calling a second correction vector calculating processing.

FIG. 27 is a diagram showing an example of the APDU for the reader/writer 110 to transmit to the IC card 100 so as to call the correction vector calculating processing S1190 at Step S1100 shown in FIG. 14. For the INS field of an APDU 2700, as shown in FIG. 27, there is substituted a corresponding command ID. For the data field, there are substituted the coordinates of all the featuring points of the input fingerprint, as extracted in the preprocessing.

Figure 28:
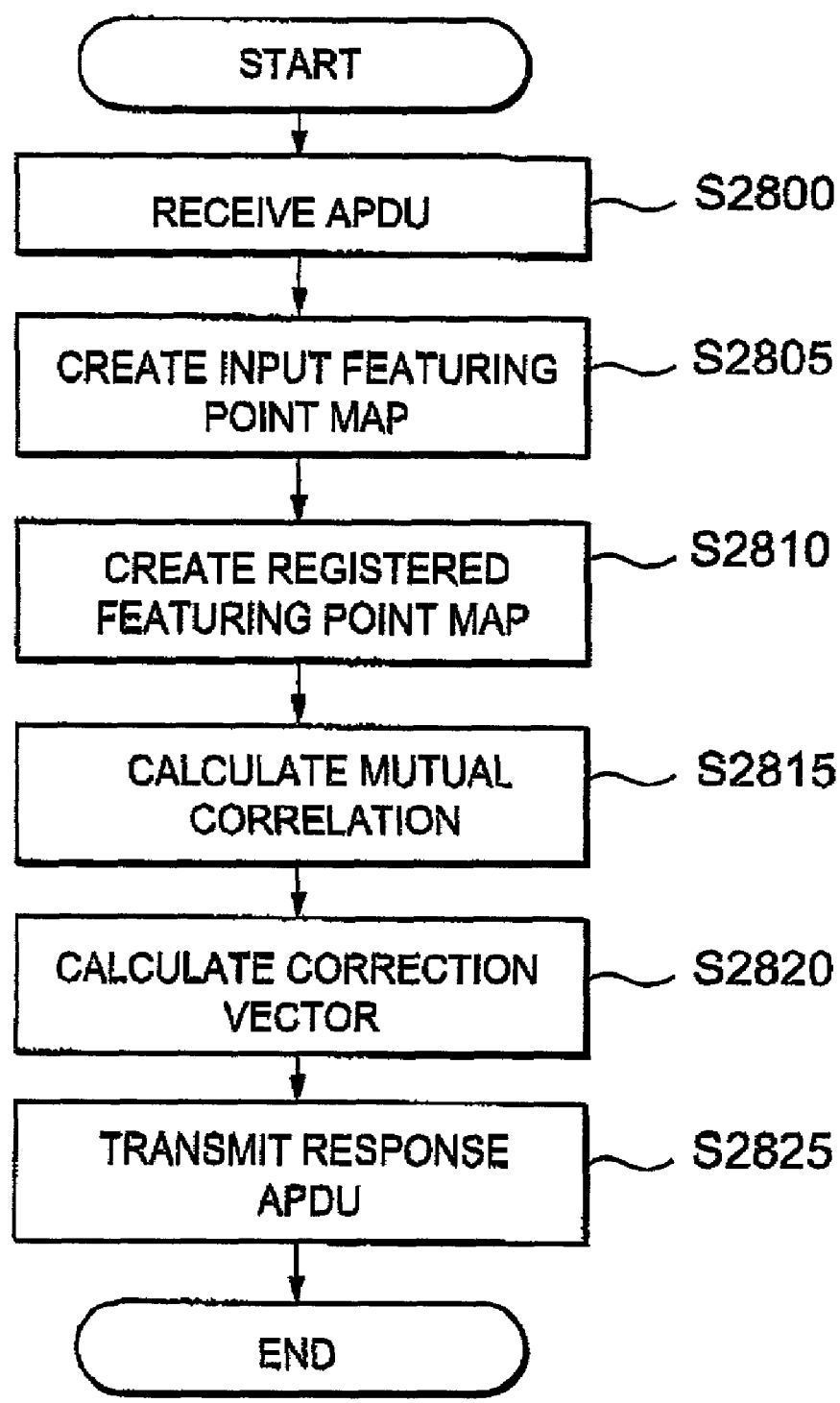
FIG. 28 is a chart showing a detailed flow of the second correction vector calculating processing.

FIG. 28 is a chart showing a detailed flow of the correction vector calculating processing S1190 to be called by the APDU 2700.

Figure 29:
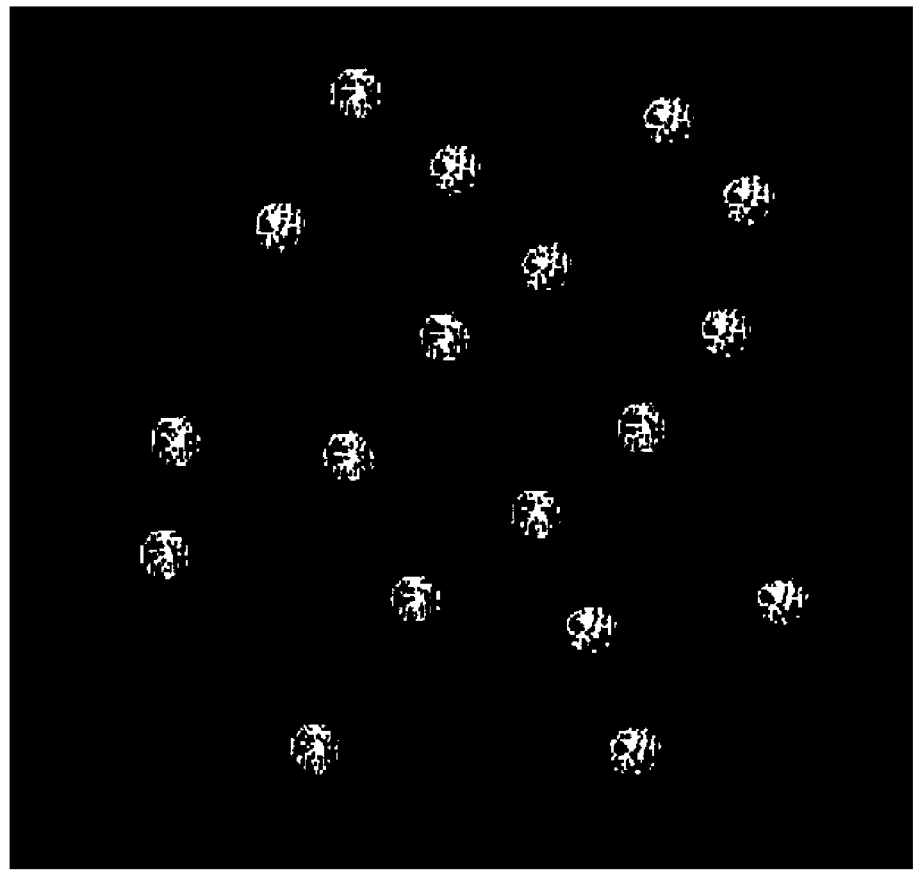
FIG. 29 is a diagram showing an example of a featuring point map.

When the IC card 100 receives the APDU 2700 (S2800), it creates the featuring point map of the input fingerprint (S2805) by using the coordinates of the featuring points of the input fingerprint thus sent. The featuring point map is called the image that has a specific luminance distribution in the peripheries of the coordinates of the individual featuring points. FIG. 29 is a diagram showing an example of the featuring point map. The shape, size and so on of the luminance distribution in the peripheries of the featuring point coordinates are properly selected according to the packaging conditions.

When the featuring point map is created for the input fingerprint, the featuring point map is then likewise generated from the coordinates of the featuring points of the registered featuring points recorded in the fingerprint information (S2810).

By regarding the featuring point map of the input fingerprint and the registered fingerprint as two-dimensional signals, moreover, there is calculated a normalized mutual correlation (S2815). This mutual correlation is calculated by using the usually used method such as the method that is described on pp. 37 of "Digital Picture Processing" (written by Azriel Roseufeld and Arinash C. Kak, Academic Press Volume 2, 1982).

Next, the position of the largest normalized mutual correlation is detected, and the positional displacement at this time is recorded as the correction vector in the RAM 230 of the IC card 100 (S2820).

Moreover, a proper status is substituted for the response APDU 1510 shown in FIG. 16, and the response APDU 1510 is transmitted to reader/writer 110 (S2825).

Next, here will be described the case in which the correction vector is to be calculated by the reader/writer 110. In this case, Steps S1100, S1190 and S1105 shown in FIG. 14 are replaced by the processing, as shown in FIG. 30.

Figure 30:
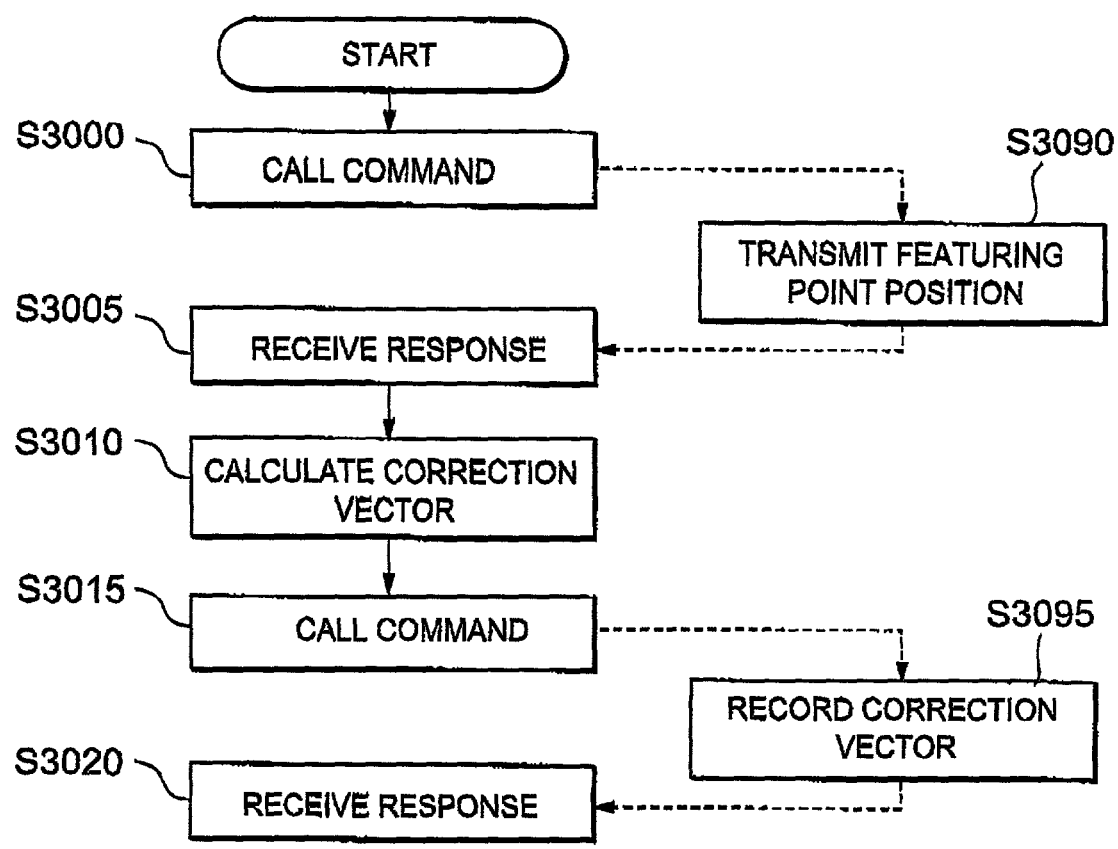
FIG. 30 is a chart showing a processing flow of the case in which the correction vector is calculated by a reader/writer 110.

When the comparing processing is started in the processing shown in FIG. 30, the reader/writer 110 transmits at first the APDU requesting the transmission of the coordinates of the featuring points of the registered fingerprint to the IC card 100 (S3000).

Figure 31:
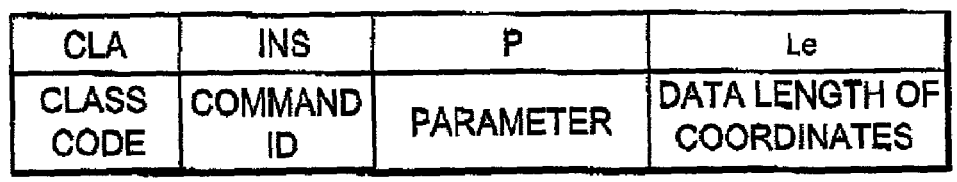
FIG. 31 is a diagram showing an example of the APDU requesting a transmission of the coordinates of featuring points of a registered fingerprint.

FIG. 31 is a diagram showing an example of the APDU requesting a transmission of the coordinates of the featuring points of the registered fingerprint. As shown in FIG. 31, a proper command ID is substituted for the INS field of an APDU 2710, and the length of the coordinate data of the featuring points to be returned from the IC card 100 is stored in the Le field.

Figure 32:
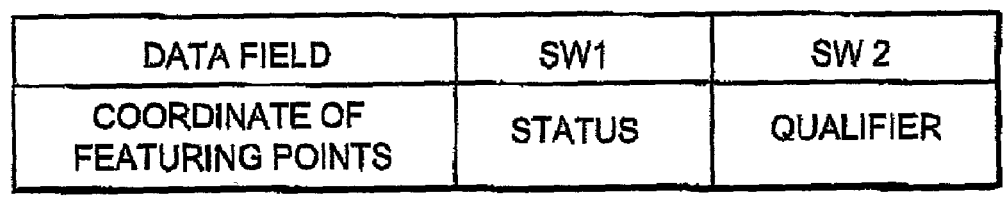
FIG. 32 is a diagram showing an example of the response APDU from a featuring point transmitting processing.

When the IC card 100 receives the APDU 2710, it stores the coordinates of the featuring points, as recorded in the fingerprint information of the IC card 100, in the data field of the response APDU, as shown in FIG. 32, and transmits them to the reader/writer 110 (S3090).

When the reader/writer 110 receives a response APDU 2720 from the IC card 100 (S3005), it creates the featuring point map as with the method shown in FIG. 28, and calculates and records the correction vector in the RAM 320 of the reader/writer 110 (S3010).

Next, the reader/writer 110 issues a command for recording the correction vector in the IC card 100 (S3015). Specifically, the APDU of the same type as that of the APDU 1500, as shown in FIG. 15, is transmitted to the IC card 100.

The IC card 100 records, when it receives the APDU, the correction vector, as stored in the APDU, in the RAM 230 of the IC card 100, and transmits the response APDU, as shown in FIG. 16, to the reader/writer 110 (S3095).

When the reader/writer 110 receives the response APDU (S3020), the processing advances to Step S1107, at which the status of the response APDU is checked.

Even where the correction vector is determined not from the core position but by the featuring point map, as described hereinbefore, the correction vector can be determined more quickly than that of the case in which the entirety (or a portion) of the fingerprint image is matched. By adjusting the size of the luminance distribution given to the periphery of a featuring point, moreover, the position can be precisely corrected even the fingerprint is distorted or rotated.

According to the correct person authentication system of the present invention, as has been described in detail hereinbefore, the information intrinsic to the user is personally administered by the IC card so that the acceptability of the user can be improved better than the case in which the information is centrally controlled by a server or the like. Furthermore, the possibility, in which a large volume of biological information is stolen at one time, can be reduced and the cost for recording/managing the biological information can be lowered.

Moreover, the fingerprint information and the fingerprint identification function are implemented within the IC card and are inhibited to be accessed thereto from the outside, so that the fingerprint information and the comparison result of the user can be made difficult to counterfeit, tamper and pirate, thereby preventing impersonation.

Since the fingerprint inputting function and the preprocessing function of the fingerprint identification are implemented in the reader/writer, the fingerprint identification can be made with the CPU of a general IC card.

Furthermore, the fingerprint identification function separately implemented in the IC card and the reader/writer, the identification processing becomes hard to analyze.

The coordinates of the core as a featuring structure of the fingerprint is recorded in the fingerprint information in the IC card and the coordinates of the core are detected from the fingerprint image that is newly inputted through preprocessing, whereby the coordinates of the featuring points recorded in the fingerprint information are corrected, and the chip image recorded in the fingerprint information is retrieved by chip matching in the periphery of the corrected coordinates on the fingerprint image. Then, according to the number of the matched chip images, it is possible to decide the identity between the fingerprint information and the fingerprint image. Accordingly, fingerprint identification can be performed even with an IC card having a small RAM capacity.

At the time of chip matching, the mismatched bit number retrieval table having the number of mismatched bit recorded in advance is used to calculate the number of bits made mismatched by the chip matching, so that the chip matching ends and shifts to a next processing when the bit number exceeds the predetermined threshold value, to make the fingerprint identification by using the IC card having a low operating speed.

Here, the foregoing embodiment has been described on the case in which the fingerprint is used as the biological information, but it is possible to use another biological information.

Where an iris is used as the biological information, for example, the reader/writer 110 of FIG. 1 is provided with an iris information input unit for inputting the iris information, in place of the fingerprint input unit 113, and the preprocessing unit 112 preprocesses the iris image inputted and outputs an iris code necessary for the iris identification. The iris code is calculated by the method which is described on pp. 1148 to 1161 of document (as will be called the "Document 4"): IEEE Transactions on pattern analysis and machine intelligence, Vol. 15, No. 11, November 1993, for example.

The iris code thus calculated is transmitted to the IC card 100. Here, the transmission of the iris code to the IC card 100 may be completed at one time.

In the IC card 100 of FIG. 1, the iris code is recorded as the template of the biological information in place of the fingerprint information 104. When the iris code is received from the reader/writer 110, their is identification program in the IC card 100 compares the iris code transmitted from the reader/writer 110 with the iris code recorded in the EEPROM or the like in the IC card 100. This identification is made according to the method described in Document 4, for example, by calculating the Hamming distance of the iris code and by depending upon whether or not the calculated Hamming distance is no more than a predetermined threshold value. Where the calculated Hamming distance is no more than the threshold value, moreover, it is decided that there is a match as to the iris code, and the access to the authentication information 105 of the electronic authentication processing unit 103 is permitted as in the fingerprint case so that the electronic authentication is done between the applications 131 and the electronic authentication unit 103.

INDUSTRIAL APPLICABILITY

According to the present invention, as has been described hereinbefore, it is possible to reduce a mental resistance of the user. Furthermore, the possibility, in which a large volume of biological information is stolen at one time, can be reduced and the cost for recording/managing the biological information can be lowered.

In addition, the biological information and the user identification result can be made difficult to counterfeit, tamper and pirate, thereby preventing impersonation.

Since the biological information identification can be made with the CPU of an IC card being a general mobile storage device having a computing function, it is possible to lower the cost for the system.

The invention claimed is:

1. An authentication system comprising:
   a mobile storage device; and
   a reader/writer for performing at least one of reading information from and writing information into said mobile storage device,
   wherein said reader/writer comprises:
   a biological information input device which inputs fingerprint information,
   preprocessing means which calculates coordinates and curvatures for a plurality of candidate points of the fingerprint information inputted by the biological information input device, calculates an average value of the coordinates for the plurality of candidate points, and determines a core position by the average value of the coordinates for the plurality of candidate points;
   a transmitting means for transmitting the core position generated in the preprocessing means to said mobile storage device according to a request from said mobile storage device,
   wherein said mobile storage device comprises:
   a template which registers a plurality of coordinates of featuring points of the fingerprint and partial images in a vicinity of the coordinates;
   a private key to be used for electronic authentication, calculating means for calculating an information for correcting a positional displacement based on a core position of a registered fingerprint recorded in said template and a core position of an input fingerprint that is newly inputted, by referring to said core position generated in the reader/writer;
   requesting means for calculating coordinates of featuring points of the input fingerprint by calculating information for correcting the positional displacement with each of the coordinates of featuring points and for requesting information for specifying the partial images in the vicinity of the coordinates of featuring points of the inputted fingerprint from the reader/writer;
   judging means for judging whether the partial images in the vicinity of the coordinates of the fingerprint registered in the template and the partial images in the vicinity of the coordinates of featuring points of the inputted fingerprint match, and in accordance with a matching result, judges whether the fingerprint registered in the template and the input fingerprint are identical; and
   means for making the private key available when the result of judging fingerprints are identical, wherein the requesting means of the mobile storage device repeatedly requests information for specifying each partial image one by one, and wherein the transmitting means of the reader/writer comprises, for each partial image:

means for extracting from the input fingerprint a partial image requested by the requesting means of the mobile storage device, means for transmitting the extracted partial image to the mobile storage device, and means for repeatedly extracting and transmitting each of the partial images one by one until a satisfactory level of matching is achieved, and wherein the judging means of the mobile storage device comprises:

means for repeating the matching result for each partial image.

2. An authentication system according to claim 1, wherein said reader/writer further comprises:

calculating means for calculating information for correcting a positional displacement between a registered fingerprint in said template and an input fingerprint that is newly input by forming images having specific luminance distributions in the peripheries of individual featuring points with regard to the input fingerprint and the registered fingerprint, and by correlating said images therebetween, retrieving means for retrieving a partial image in the vicinity of a featuring point of said registered fingerprint by matching in the vicinity of coordinates for an image of said inputted fingerprint, wherein the positional displacement of the coordinates has been corrected, and judging means for judging whether or not said fingerprint image is identical to said template according to the number of matched said partial images.

3. An authentication system according to claim 1, wherein the calculation means for calculating an information for correcting a positional displacement based on a core position calculates other candidate points of the fingerprint information by calculating a coordinate of the candidate point of an initial position and a normal vector of ridge at the initial position of the candidate point.

4. An authentication system according to claim 1, wherein the preprocessing means invalidates the candidate points having no more than a threshold value of curvature, and determines the core position by averaging the coordinates for the candidate points having more than a threshold value of curvature.

5. An authentication system according to claim 1, wherein the judging means judges identity of the fingerprint registered in the template and the input fingerprint, when a number of the match is no less than a threshold value.

6. An authentication system according to claim 1, wherein the private key is used for authentication of applications in a computer being connected to the reader/writer.

7. A mobile storage device for authentication utilizing biometric information, the mobile storage device performing at least one of transferring read information to and receiving write information from a reader/writer, wherein the reader/writer comprises:

a biological information input device which inputs fingerprint information;

preprocessing means which calculates coordinates and curvatures for a plurality of candidate points of the fingerprint information inputted by the biological information input device, calculates an average value of the coordinates for the plurality of candidate points, and determines a core position by the average value of the coordinates for the plurality of candidate points; and transmitting means for transmitting the core position generated in the preprocessing means to said mobile storage device according to a request from said mobile storage device, wherein said mobile storage device comprises:

a template which registers a plurality of coordinates of featuring points of the fingerprint and partial images in a vicinity of the coordinates;

a private key to be used for electronic authentication;

calculating means for calculating an information for correcting a positional displacement based on a core position of a registered fingerprint recorded in said template and a core position of an input fingerprint that is newly inputted, by referring to each said core positions in the reader/writer;

requesting means for calculating coordinates of featuring points of the input fingerprint by calculating information for correcting the positional displacement with each of the coordinates of featuring points, and for requesting information for specifying the partial images in the vicinity of the coordinates of featuring points of the inputted fingerprint to the reader/writer;

judging means for judging whether the partial images in vicinity of the coordinates of the fingerprint registered in the template and the partial images in the vicinity of the coordinates of featuring points of the inputted fingerprint match, and in accordance with a plurality of results of the matching, judges whether the fingerprint registered in the template and the input fingerprint are identical; and means for making the private key available when the result of judging fingerprints are identical, wherein the requesting means of the mobile storage device repeatedly requests information for specifying each partial image one by one, and wherein the transmitting means of the reader/writer comprises, for each partial image:

means for extracting from the input fingerprint a partial image requested by the requesting means of the mobile storage device, means for transmitting the extracted partial image to the mobile storage device, and means for repeatedly extracting and transmitting each of the partial images one by one until a satisfactory level of matching is achieved, and wherein the judging means of the mobile storage device comprises:

means for repeating the matching result for each partial image.

8. A mobile storage device according to claim 7, wherein the mobile storage device is an integrated circuit (IC) card.

9. An authentication system for authentications with biological information, comprising:

a reader/writer for performing the reading of information from and the writing of information into a mobile storage device; and a terminal connected with said reader/writer, wherein said reader/writer comprises:

a biological information input device which inputs fingerprint information;

preprocessing means which calculates coordinates and curvatures for a plurality of candidate points of the fingerprint information inputted by the biological information input device, calculates an average value of the coordinates for the plurality of candidate points and determines a core position by the average value of the coordinates for the plurality of candidate points and determines a core position by the average value of the coordinates for the plurality of candidate points; and transmitting means for transmitting the core position generated in the preprocessing means to said mobile storage device according to a request from said mobile storage device, wherein said mobile storage device comprises:

a template which registers a plurality of coordinates of featuring points of the fingerprint and partial images in the vicinity of the coordinates;

a private key to be used for electronic authentication;

calculating means for calculating information for correcting a positional displacement based on a core position of the fingerprint registered in said template and a core position of an input fingerprint that is newly inputted, by referring to said core position generated in the reader/writer;

requesting means for calculating coordinates of featuring points of the input fingerprint by calculating information for correcting the positional displacement with each of the coordinates of featuring points and for requesting information for specifying the partial images in the vicinity of the coordinates of featuring points of the inputted fingerprint to the reader/writer;

judging means for judging whether the partial images in the vicinity of the coordinates of the fingerprint registered in the template and the partial images in the vicinity of the coordinates of the featuring points of the inputted fingerprint match and in accordance with a matching result, and judging whether the fingerprint registered in the template and the input fingerprint are identical; and means for making the private key available when the judging result of the fingerprints is identical, wherein the requesting means for the mobile storage device repeatedly requests information for specifying each partial image one by one, and wherein the transmitting means of the reader/writer comprises, for each partial image:

means for extracting from the input fingerprint a partial image requested by the requesting means of the mobile storage device, means for transmitting the extracted partial image to the mobile storage device, and means for repeatedly extracting and transmitting each of the partial images one by one until a satisfactory level of matching is achieved, and wherein the judging means of the mobile storage device comprises:

means for repeating the matching result for each partial image.

10. An authentication system comprising: a mobile storage device of a user; and a reader/writer for performing the reading of information from and writing of information into said mobile storage device, wherein said reader/writer comprises:

an interface for transmitting and receiving information to and from said mobile storage device;

an input device for accepting the input of the biological information of said user; and a processing unit which performs a preprocessing on said biological information inputted through said input device, transmits a command for acquiring information to specify one partial image, extracts one partial image corresponding to the information coming from said mobile storage device for specifying said one partial image, from said preprocessed biological information, transmits said extracted one partial image, to said mobile storage device, and receives the collation result of said one partial image, from said mobile storage device;

wherein said mobile storage device comprises:

an interface for transmitting and receiving information to and from said reader/writer;

a storage device for storing a partial image of a biological information of said user registered in advance and the information for specifying said partial image; and a processing unit which transmits, in response to said command from said reader/writer, the information for specifying said one partial image in said storage device, collates, in response to said one partial image from said reader/writer corresponding to the information for specifying said one partial image, said one partial image from said reader/writer and said one partial image in said storage device, and transmits said collation result to said reader/writer, and wherein said processing unit of said reader/writer comprises:

means for repeatedly transmitting said command, extracting said one partial image, transmitting said extracted one partial image, and receiving the collation result of said one partial image, for each partial image, until the matching number of said partial images as a result of said collation exceeds a predetermined threshold value, and wherein said processing unit of said mobile storage device comprises:

means for repeatedly transmitting the information for specifying said one partial image, collating said partial image, and transmitting said collation result, for each partial image.

11. An authentication system according to claim 10, wherein said processing unit of said reader/writer detects, in said preprocessing, the position of one portion having a featuring constitution in said biological information, from said inputted biological information, and sends out the detected one position to said mobile storage device, wherein said storage device of said mobile storage device further stores the position of one portion having the featuring constitution in said biological information, and wherein said processing unit of said mobile storage device calculates correction information for correcting the displacement between the position of one portion having a featuring constitution in said inputted biological information received from said reader/writer and the position of one portion having a featuring constitution in the biological information stored in said storage device, corrects the information for specifying said partial image, with said correction information, and transmits the corrected information to said reader/writer.

12. An authentication system according to claim 10, wherein said processing unit of said reader/writer detects, in said preprocessing, the coordinates of all featuring points of said inputted biological information, and sends out the detected coordinates to said mobile storage device, wherein said storage device of said mobile storage device further stores the coordinates of the individual featuring points of said biological information, and wherein said processing unit of said mobile storage device generates an inputted biological information featuring point map being an image having a specific brightness distribution in the periphery of coordinates of the individual featuring points, with the coordinates of all featuring points of said inputted biological information, generates the registered biological information featuring point map using the coordinates of the individual featuring points of the image data of the biological information stored in said storage device, calculates the correlations between said inputted biological information featuring point map and said registered biological information featuring point map, determines the positional displacement having the maximum correlation value calculated, as correction information, corrects the information for specifying said partial image, with said correction information, and transmits the corrected information to said reader/writer.

13. An authentication system according to claim 10, wherein said storage device of said mobile storage device further stores the coordinates of the individual featuring points of said biological information, and wherein said processing unit of said mobile storage device transmits the coordinates of the individual featuring points stored in said storage device to said reader/writer, wherein said processing unit of said reader/writer detects, in said preprocessing, the coordinates of all featuring points of the image data of said inputted biological information, generates an inputted biological information featuring point map being an image having specific brightness distribution in the periphery of the detected coordinates of the individual featuring points, generates the registered biological information featuring point map using the coordinates of the individual featuring points received from said mobile storage device, calculates the correlations between said the inputted biological information featuring point map and said registered biological information featuring point map, determines the positional displacement having the maximum correlation value calculated, as correction information, and transmits the correction information to said mobile storage device, and wherein the processing unit of said mobile storage device corrects said partial image, with said received correction information, and transmits the corrected information.

14. A mobile storage device capable of communicating with a reader/writer for receiving the input of biological information of a user, wherein said reader/writer comprises:

an interface for transmitting and receiving information to and from said mobile storage device;

an input device for accepting the input of the biological information of said user; and a processing unit which performs a preprocessing on said biological information inputted through said input device, transmits a command for acquiring information to specify one partial image, to said mobile storage device, extracts one partial image corresponding to the information coming from said mobile storage device for specifying said one partial image, from said preprocessed biological information, transmits said extracted one partial image to said mobile storage device, and receives a collation result of said one partial image, from said mobile storage device, wherein said mobile storage device comprises:

an interface for transmitting said receiving information to and from said reader/writer;

a storage device for storing a partial image of the preregistered biological information of said user and information for specifying said partial image; and a processing unit which transmits the information for specifying said one partial image in said storage device, to said reader/writer, in response to said command from said reader/writer, collates said one partial image from said reader/writer and said one partial image in said storage device, and transmits the collation result to said reader/writer, and wherein said processing unit of said reader/writer comprises:

means for repeatedly transmitting said command, extracting said one partial image, transmitting said extracted one partial image, and receiving the collation result of said one partial image, for each partial image, until the matching number of said partial images as a result of said collation exceeds a predetermined threshold value, and wherein said processing unit of said mobile storage device comprises:

means for repeatedly transmitting information for specifying said one partial image in response to said command from said reader/writer, collating said partial image in response to said one partial image from said reader/writer, and transmitting said collation result, for each partial image.

15. A mobile storage device according to claim 14, wherein said storage device of said mobile storage device further stores the position of one portion having the featuring constitution in said biological information, and wherein said processing unit of said mobile storage device calculates, as said preprocessing, correction information for correcting the displacement between the position of one portion having a featuring constitution in said biological information, which is detected and sent from said inputted biological information, and the position of one portion having a featuring constitution in the biological information stored in said storage device, corrects the information for specifying said partial image, with said correction information, and transmits the corrected information to said reader/writer.

16. A mobile storage device according to claim 14, wherein said storage device of said mobile storage device further stores the coordinates of the individual featuring points of said biological information, and wherein said processing unit of said mobile storage device generates the inputted biological information featuring point map being an image having specific brightness distribution in the periphery of the coordinates of the individual featuring points, using the coordinates of all featuring points of said inputted biological information, which are detected and sent out by the processing unit of said reader/writer, generates the registered biological information featuring point map, using the coordinates of the individual featuring points of the biological information stored in said storage device, calculates the correlations between said inputted biological information featuring point map and said registered biological information featuring point map, determines the positional displacement having the maximum correlation value calculated, as correction information, corrects the information for specifying said partial image, with said correction information, and transmits the corrected information to said reader/writer.

17. A mobile storage device according to claim 14, wherein said mobile storage device is an integrated circuit (IC) card.

18. An authentication system for authentications with the biological information of a user, comprising:
　a reader/writer for performing the reading of information from and the writing of information into a mobile storage device of said user; and
　a terminal connected with said reader/writer,
　wherein said reader/writer comprises:
　an interface for transmitting and receiving information to and from said mobile storage device;
　an input device for accepting the input of the biological information; and
　a processing unit which performs a preprocessing on said biological information inputted through said input device, transmits a command for acquiring information to specify one partial image, to said mobile storage device, extracts one partial image corresponding to the information coming from said mobile storage device for specifying said one partial image, from said preprocessed biological information, transmits said extracted one partial image to said mobile storage device, and receives the collation result of said one partial image, from said mobile storage device,
　wherein said mobile storage device comprises:
　an interface for transmitting and receiving information to and from said reader/writer;
　a storage device for storing a partial image of preregistered biological information of said user and information for specifying said partial image; and
　a processing unit which transmits, in response to said command from said reader/writer, the information for specifying said one partial image in said storage device, collates, in response to said one partial image from said reader/writer corresponding to the information for specifying said one partial image, said one partial image from said reader/writer and said one partial image in said storage device, and transmits said collation result to said reader/writer, and
　wherein said processing unit of said reader/writer comprises:
　means for repeatedly transmitting said command, extracting said one partial image, transmitting said extracted one partial image, and receiving the collation result of said one partial image, for each partial image, until the matching number of said partial images as a result of said collation exceeds a predetermined threshold value, and
　wherein said processing unit of said mobile storage device comprises:
　means for repeatedly transmitting information for specifying said one partial image, collating said partial image, and transmitting said collation result, for each partial image.

19. An authentication system according to claim 10, wherein the processing unit of the reader/writer judges whether or not the information for specifying the partial image included in a response from the mobile storage device is invalid, and whether or not a status included in a response from the mobile storage device indicates an abnormal termination of the mobile storage device,
　(i) in cases in which the information for specifying the partial image is invalid, transmits to the mobile storage device a command for obtaining information for specifying another one partial image,
　(ii) in cases in which the status indicates an abnormal termination of the mobile storage device, terminates processing, and
　(iii) in cases in which the information for specifying the partial image is not invalid, and the status does not indicate an abnormal termination of the mobile storage device, extracts the one partial image from said biological information after the preprocessing.

20. A mobile storage device according to claim 14, wherein the processing unit of the reader/writer judges whether or not the information for specifying the partial image included in a response from the mobile storage device indicates an abnormal termination of the mobile storage device.
　(i) in cases in which the information for specifying the partial image is invalid, transmits to the mobile storage device a command for obtaining information for specifying another one partial image,
　(ii) in cases in which the status indicates an abnormal termination of the mobile storage device, terminates processing, and
　(iii) in cases in which the information for specifying the partial image is not invalid, and the status does not indicate an abnormal termination of the mobile storage device, extracts the one partial image form said biological information after the preprocessing.

21. An authentication device according to claim 18, wherein the processing unit of the reader/writer judges whether or not the information for specifying the partial image included in a response from the mobile storage device is invalid, and whether or not a status included in a response from the mobile storage device indicates an abnormal termination of the mobile storage device,
　(i) in cases in which the information for specifying the partial image is invalid, transmits to the mobile storage device a command for obtaining information for specifying another one partial image,
　(ii) in cases in which the status indicates an abnormal termination of the mobile storage device, terminates processing, and
　(iii) in cases in which the information for specifying the partial image is not invalid, and the status does not indicate an abnormal termination of the mobile storage device, extracts the one partial image form said biological information after the preprocessing.

* * * * *